United States Patent
Yokoohji

(10) Patent No.: US 10,768,865 B2
(45) Date of Patent: Sep. 8, 2020

(54) PRINTING SYSTEM FOR CONVERTING A JOB TICKET INTO PRINT FORMAT USING SAMPLE PRINT TICKETS AND PRINT JOB HISTORY MAPPING USER AND TAFGET VALUES TO GENERATE NATIVE PRINT JOB TICKET

(71) Applicant: KONICA MINOLTA LABORATORY U.S.A., INC., San Mateo, CA (US)

(72) Inventor: Ryoichi Yokoohji, San Mateo, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 68 days.

(21) Appl. No.: 15/475,691

(22) Filed: Mar. 31, 2017

(65) Prior Publication Data

US 2018/0285030 A1 Oct. 4, 2018

(51) Int. Cl.
*G06F 3/12* (2006.01)

(52) U.S. Cl.
CPC .......... *G06F 3/1205* (2013.01); *G06F 3/1256* (2013.01); *G06F 3/1273* (2013.01); *G06F 3/1282* (2013.01); *G06F 3/1245* (2013.01); *G06F 3/1255* (2013.01)

(58) Field of Classification Search
None
See application file for complete search history.

(56) References Cited

U.S. PATENT DOCUMENTS

| | | | | |
|---|---|---|---|---|
| 2008/0167996 A1* | 7/2008 | Broome | ................. | G06Q 20/04 705/64 |
| 2010/0073712 A1* | 3/2010 | Cain | .................... | G06F 3/1204 358/1.15 |
| 2011/0075195 A1* | 3/2011 | Cain | .................... | G06F 3/1205 358/1.15 |
| 2011/0188069 A1* | 8/2011 | Giannetti | .................. | G06F 3/12 358/1.15 |
| 2011/0242569 A1* | 10/2011 | Ohara | .................. | G06F 3/1297 358/1.13 |
| 2011/0299106 A1* | 12/2011 | Mori | .................... | G06F 3/1205 358/1.9 |

(Continued)

*Primary Examiner* — Benny Q Tieu
*Assistant Examiner* — Haris Sabah
(74) *Attorney, Agent, or Firm* — Buchanan Ingersoll & Rooney PC

(57) ABSTRACT

A method, a non-transitory computer readable medium, and a system are disclosed for creating a mapping library for converting a job ticket. The method includes obtaining a print job ticket schema that comprises a plurality of user items and user values; obtaining at least one sample print ticket each of which comprises a part of the plurality of user items and user values; obtaining a print job history that indicates whether a print job was successfully executed using the job ticket that has been previously created; and displaying a graphical user interface (GUI), which allows a user to associate the user values with target values to be used to execute a print job, wherein at least one of the user values and/or at least one of the target values that was used for the successful print job is shown in a different appearance from other user values and/or target values.

20 Claims, 22 Drawing Sheets

(56) References Cited

U.S. PATENT DOCUMENTS

2012/0019859 A1* 1/2012 Natori ............... G06F 3/1205
358/1.15
2013/0321827 A1* 12/2013 Liebelt ............... H04N 1/60
358/1.9

* cited by examiner

PRINTING SYSTEM FOR CONVERTING A JOB TICKET INTO PRINT FORMAT USING SAMPLE PRINT TICKETS AND PRINT JOB HISTORY MAPPING USER AND TAFGET VALUES TO GENERATE NATIVE PRINT JOB TICKET

FIELD OF THE INVENTION

The present disclosure relates to a printing history function that authenticates mapped values, and more particularly to a method and system for creating a mapping library for converting a job ticket from a user print job ticket to a native print job ticket.

BACKGROUND OF THE INVENTION

In the print shop, print orders are made using job tickets, but in general, the specifications of job tickets sent to print shops are often different among customers. For example, the data format (JSON, XML, JDF, CSV) of the job ticket differs depending on what kind of job ticket generation program is used by the customer.

On the other hand, since each of the printers installed in the print shop can basically support only a single specification, the print management software has to convert data format of the job ticket, by analyzing the received job ticket, so that a printer that executes the job can accept the converted job ticket.

Furthermore, since the customer can arbitrarily change (customize) the item name and value name used in the job ticket. Even if the data format used by a customer and the data format used by a print shop is the same (For example, both is JSON), the print management software often has to convert the item name and setting value.

Conventionally, for the conversion of a job ticket, programming codes of print management software are described such that the corresponding function is incorporated in the print management software beforehand. However, as the number of types of data formats increases or customers often add new item names or setting values, in such a case, it is necessary to rewrite the code itself of the print management software, and this can be time consuming and expensive.

For using the mapping library creator, a user need to have a lot of knowledge, specifically the user have to know what kinds of items and values are included in job tickets send from user. Therefore, a function that supports the user to make a mapping library is desired.

SUMMARY OF THE INVENTION

In consideration of the above issues, it would be desirable to have a method and system for creating a mapping library for converting a job ticket, which uses a print job history that indicates whether a print job was previously successfully executed using the job ticket that previously been created and a graphical user interface (GUI), which allows a user to associate user values with target values.

A method is disclosed for creating a mapping library for converting a job ticket, the method comprising: obtaining a print job ticket schema that comprises a plurality of user items and user values; obtaining at least one sample print ticket each of which comprises a part of the plurality of user items and user values; obtaining a print job history that indicates whether a print job was successfully executed using the job ticket that has been previously created; and displaying a graphical user interface (GUI), which allows a user to associate the user values with target values to be used to execute a print job, wherein at least one of the user values and/or at least one of the target values that was used for the successful print job is shown in a different appearance from other user values and/or target values.

A non-transitory computer readable medium (CRM) storing computer program code executed by a computer processor that performs a process for creating a mapping library for converting a job ticket is disclosed, the process comprising: obtaining a print job ticket schema that comprises a plurality of user items and user values; obtaining at least one sample print ticket each of which comprises a part of the plurality of user items and user values; obtaining a print job history that indicates whether a print job was successfully executed using the job ticket that has been previously created; and displaying a graphical user interface (GUI), which allows a user to associate the user values with target values to be used to execute a print job, wherein at least one of the user values and/or at least one of the target values that was used for the successful print job is shown in a different appearance from other user values and/or target values.

A system is disclosed, the system comprising: a server having a memory and a processor, the processor configured to: obtain a print job ticket schema that comprises a plurality of user items and user values; obtain at least one sample print ticket each of which comprises a part of the plurality of user items and user values; obtain a print job history that indicates whether a print job was successfully executed using the job ticket that has been previously created; and display a graphical user interface (GUI), which allows a user to associate the user values with target values to be used to execute a print job, wherein at least one of the user values and/or at least one of the target values that was used for the successful print job is shown in a different appearance from other user values and/or target values.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
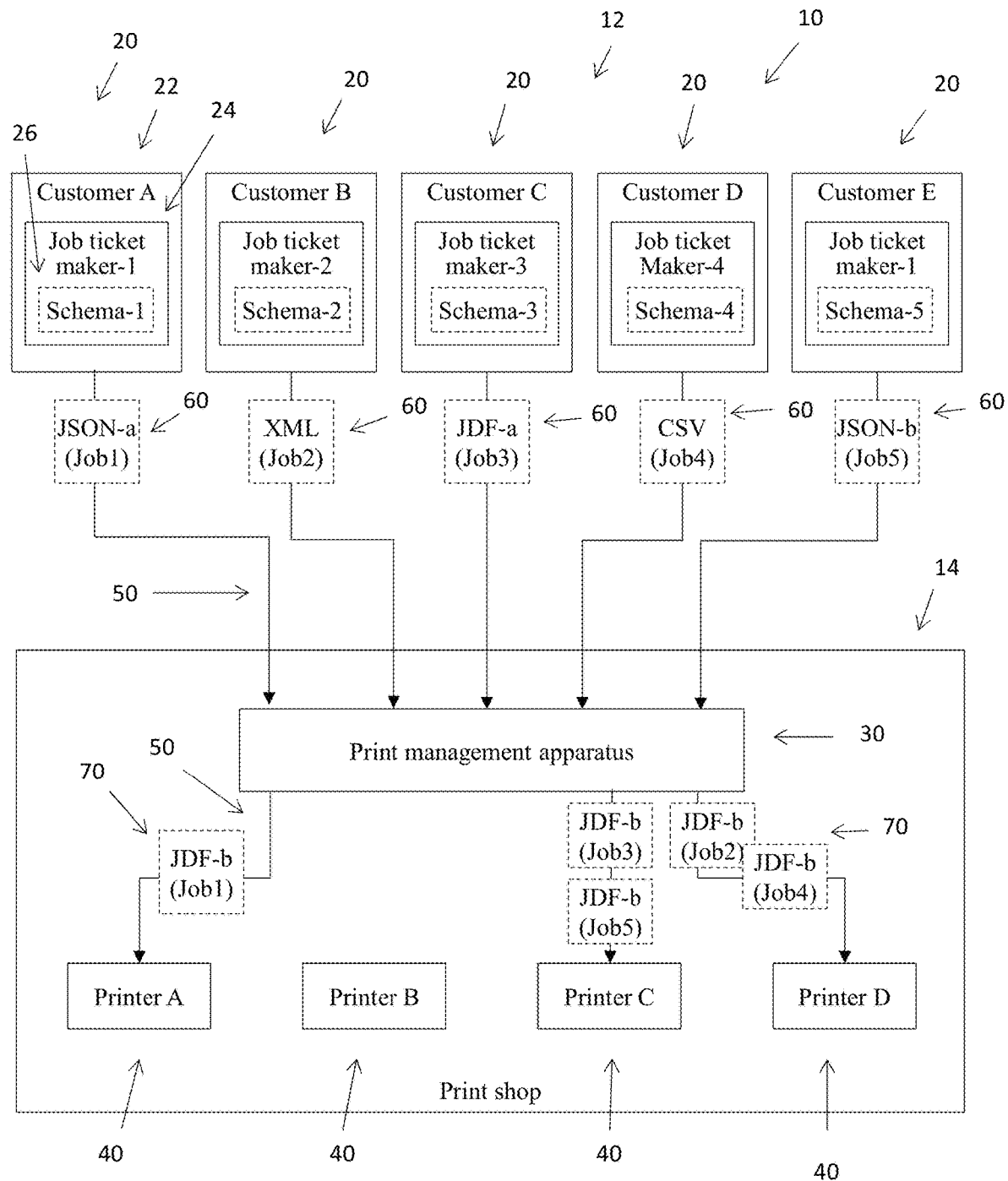
FIG. 1 is an illustration of a system and business environment in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 shows a system 100 in accordance with one or more exemplary embodiments of the invention. As shown in FIG. 1, the system 10 can include one or more buyers or customers 22 in a marketplace 12, each of the one or more buyers or customers 22 having a client or client computer 20, at least one print management server (or print management apparatus) 30, and a plurality of printers or printing devices 40, which are connected, for example by a communication network (or network) 50. In accordance with an exemplary embodiment, the plurality of printers or printing devices 40 can be located within one or more print shops 14. Each client computer 20, for example, may correspond to a personal computer (PC), a laptop, a mobile computing device (e.g., tablet PC, smartphone, etc.), a server, a mainframe, or a kiosk. As shown in FIG. 1, each of the client computers 20, the print management apparatus or server 30, and the plurality of printers 40 can be connected to each other by one or more communication networks 50 of any size having wired and/or wireless segments.

In accordance with an exemplary embodiment, each client computer 20 can be operated by a different user (for example, individual or Customer, company, etc.) and is configured to issue print job tickets 60 in a format specific to the user. Accordingly, print job tickets 60 issued by different users may have different parameter names for the same print setting/feature (for example, number of copies, stapling, two-sided printing, etc.). Example formats can include XML, JDF, JSON, CSV, and even these formats can be customized for users and/or customers.

As shown in FIG. 1, for example, Customer A 22, which is operating client computer 20 with Job ticket maker-1 24 and Schema 1 26 can issue a user print job ticket 60, for example, JSON-a (Job 1). In accordance with an exemplary embodiment, the schemas, for example, Schema-1, Schema-2, . . . can be defined by a third party vendor. The user print job ticket 60 can include multiple user print parameters and a user value for each of the user print parameters. The user print parameters and the user values form instructions for printing one or more print jobs (for example, number of copies, stapling, two-sided printing, etc.). However, as the names of the print parameters might be specific to the format of client computer A 20, the printers 40 might not be able to interpret/execute the instructions in the user print job ticket 60, and thus might not correctly print one or more print jobs.

In accordance with an exemplary embodiment, the system 10 can include the print management apparatus or server 30, which may be implemented in hardware (for example, circuitry), software, or any combination of hardware and software. The print management server 30 is configured to generate a native print job ticket 70 for each received user print job ticket. For example, the print management server 30 generates the native print job ticket 70, for example, JDF-b (Job 1) based on the user print job ticket 60. The native print job ticket 70 can include native print parameters and native values for the native print parameters. These native print parameters and native values can be successfully interpreted/executed by the printers 40, resulting in correctly printed print jobs.

In accordance with an exemplary embodiment, each user print parameter in the user print job ticket 60 can be classified as a simple-type print parameter, a normal-type print parameter, or a complex-type print parameter. For example, a complex-type print parameter can be replaced with multiple native print parameters in the native print job ticket 70. Additionally or alternatively, multiple complex-type print parameters can be replaced with a single native print parameter. Additionally or alternatively, multiple complex-type print parameters can be replaced with multiple native print parameters.

In contrast, each of a normal-type print parameter and a simple-type print parameter is replaced with a single native print parameter in the native print job ticket 70. In accordance with an exemplary embodiment, the user value for a simple-type print parameter, as specified in the user print job ticket 60, is included in the native print job ticket 70. In contrast, the user values for a normal-type print parameter and a complex-type print parameter in the user print job ticket 60 are mapped to native values, and these native values are included in the native print job ticket 70.

Figure 2:
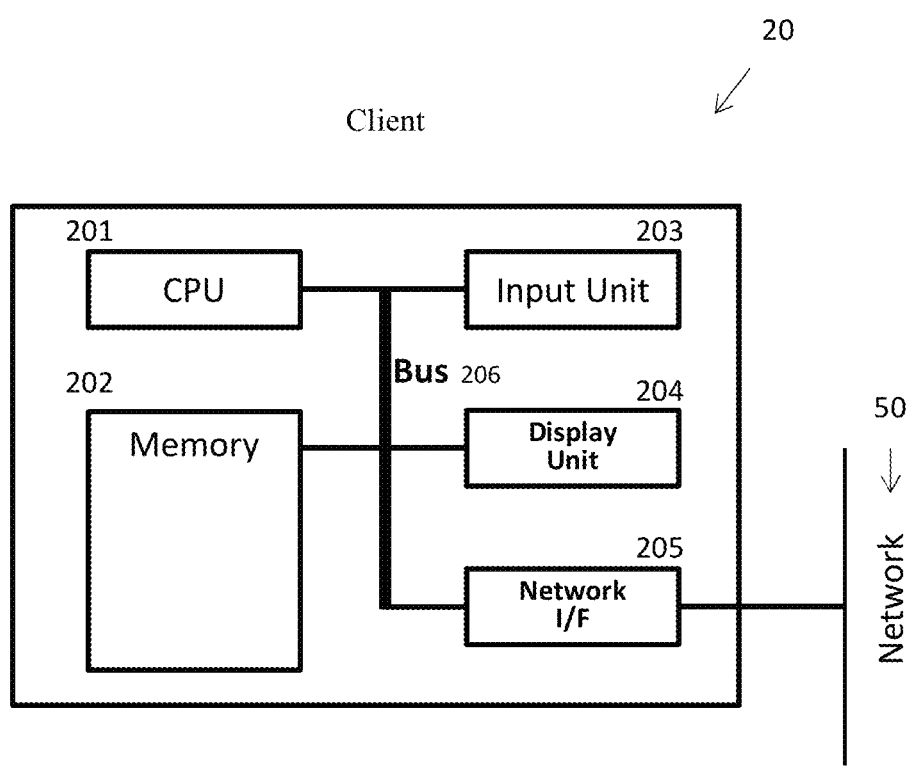
FIG. 2 is an illustration of a client or client computer in accordance with an exemplary embodiment

FIG. 2 is an illustration of a print management apparatus in accordance with an exemplary embodiment. As shown in FIG. 2, the exemplary host computer or client computer 20 can include a processor or central processing unit (CPU) 201, and one or more memories 202 for storing software programs and data (such as files to be printed), and a printer driver. The printer driver of the client computer 20 is preferably a software application that converts data to the user print job ticket 60. The processor or CPU 201 carries out the instructions of a computer program, which operates and/or controls at least a portion of the functionality of the client computer 20. The client computer 20 can also include an input unit 203, a display unit or graphical user interface (GUI) 204, and a network interface (I/F) 205, which is connected to a communication network (or network) 50. A bus 206 can connect the various components 201, 202, 203, 204, and 205 within the client computer 20.

The client computer 20 includes an operating system (OS), which manages the computer hardware and provides common services for efficient execution of various software programs. The software programs can include, for example, application software and printer driver software. In certain embodiments, the printer driver software can produce a print job, for example, the user print job ticket 60 and/or document based on an image and/or document data. In addition, the printer driver software can control transmission of the print job from the client computer 20 to the at least one server (or print management apparatus) 30 and/or the printer or printing device 40.

Figure 3:
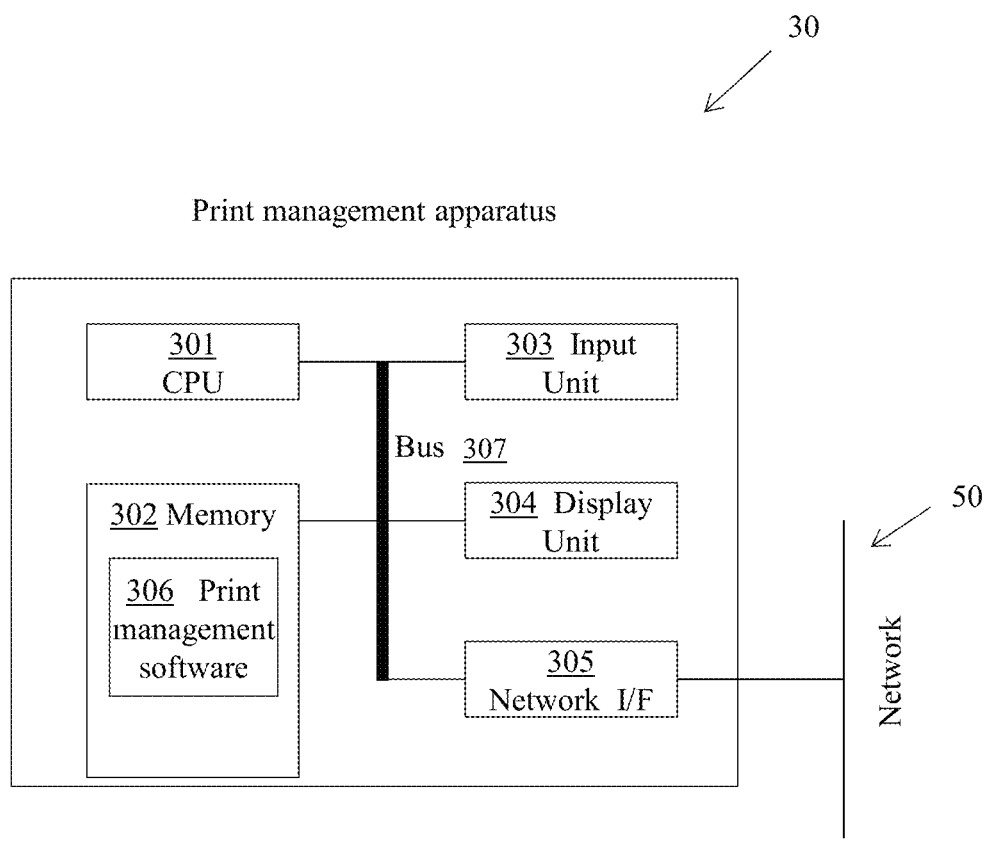
FIG. 3 is an illustration of print management apparatus in accordance with an exemplary embodiment.

FIG. 3 is an illustration of a print management apparatus or server 30 in accordance with an exemplary embodiment. As shown in FIG. 3, the print management apparatus or server 30 can include a processor or central processing unit (CPU) 301, and one or more memories 302 for storing software programs and data, which can include a print management program (or software application) 306. The processor or CPU 301 carries out the instructions of a computer program, which operates and/or controls at least a portion of the functionality of the server 30. The server 30 can also include an input unit 303, a display unit or graphical user interface (GUI) 304, and a network interface (I/F) 305, which is connected to a communication network (or network) 50. A bus 307 can connect the various components 301, 302, 303, 304, 305, and 306 within server 30. The server 30 includes an operating system (OS), which manages the computer hardware and provides common services for efficient execution of various software programs as disclosed herein.

Figure 4:
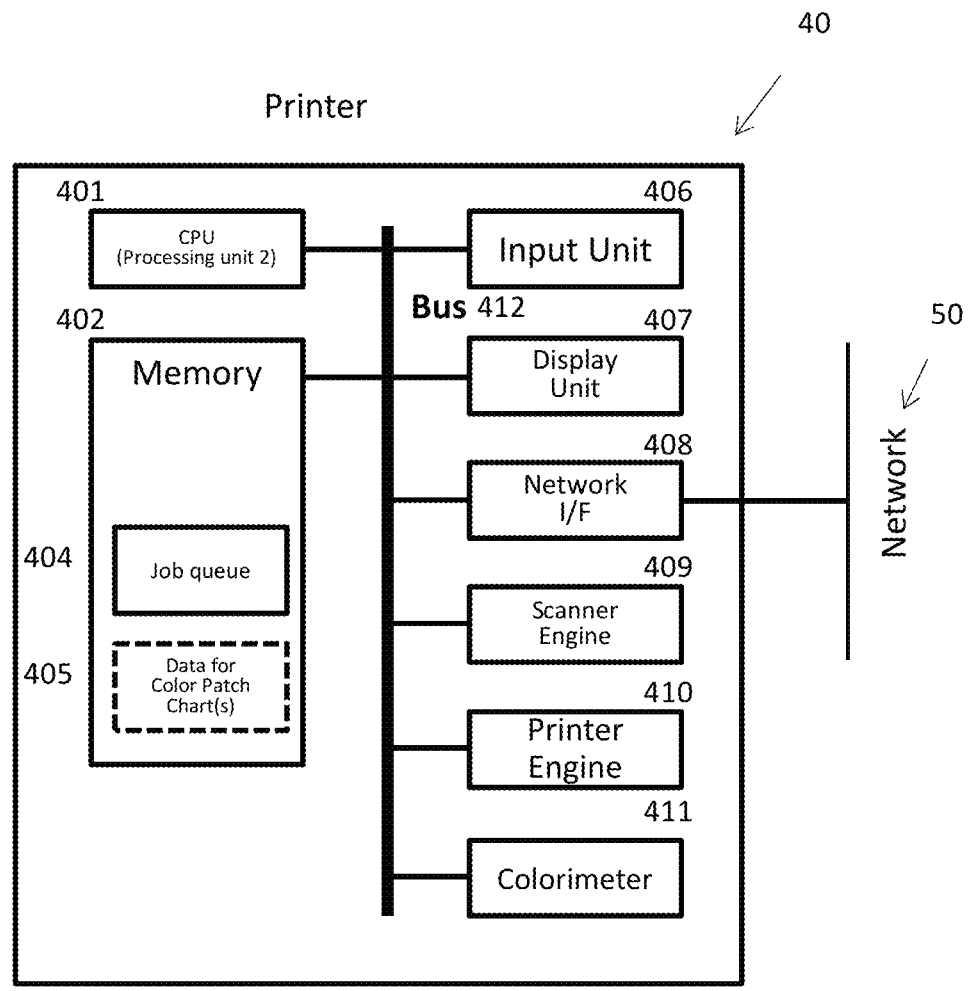
FIG. 4 is an illustration of a printer or printing device in accordance with an exemplary embodiment.

FIG. 4 is an illustration of a printer or printing device 40, which can be referred to as an image forming apparatus in accordance with an exemplary embodiment. As shown in FIG. 4, the printer 40 can include a network interface (I/F) 408, which is connected to the communication network (or network) 50, a processor or central processing unit (CPU) 401, and one or more memories 402 for storing software programs and data (such as files to be printed). For example, the software programs can include a printer controller and a tray table. The processor or CPU 401 carries out the instructions of a computer program, which operates and/or controls at least a portion of the functionality of the printer 40. In accordance with an exemplary embodiment, the one or more memories 402 can include a job queue 404 and data for color patch chart(s) 405. The printer 40 can also include an input unit 406, a display unit or graphical user interface (GUI) 407, a network interface (I/F) 408, a scanner engine (or scanner) 409, a printer engine 410, and a colorimeter 411. In accordance with an exemplary embodiment, the printer 40 can be equipped with inline colorimeter (ICCU) (or spectrophotometer) 411, which measures printed color patches in order to generate color profiles.

In accordance with an exemplary embodiment, for example, the colorimeter (or spectrophotometer) 411 can be one or more color sensors or colorimeters, such as an RGB scanner, a spectral scanner with a photo detector or other such sensing device known in the art, which can be embedded in the printed paper path, and an optional finishing apparatus or device (not shown). A bus 412 can connect the various components 401, 402, 404, 405, 406, 407, 408, 409, 410, 411 within the printer 40. The printer 40 also includes an operating system (OS), which manages the computer hardware and provides common services for efficient execution of various software programs. In accordance with an exemplary embodiment, it can be within the scope of the disclosure for the printer 40 to be a copier.

For example, in accordance with an exemplary embodiment, an image processing section within the printer 40 can carry out various image processing under the control of a print controller or CPU 401, and sends the processed print image data to the print engine 410. The image processing section can also include a scanner section (scanner 409) for optically reading a document, such as an image recognition system. The scanner section receives the image from the scanner 409 and converts the image into a digital image. The print engine 410 forms an image on a print media (or recording sheet) based on the image data sent from the image processing section. The central processing unit (CPU) (or processor) 401 and the memory 402 can include a program for RIP processing (Raster Image Processing), which is a process for converting print data included in a print job into Raster Image data to be used in the printer or print engine 410. The CPU 401 can include a printer controller configured to process the data and job information received from the one or more client computers 30, for example, received via the network connection unit and/or input/output section (I/O section) 408.

The CPU 401 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more client computers 10 to generate a print image.

In accordance with an exemplary embodiment, the network I/F 408 performs data transfer with the at least client computer 20 and/or the print management apparatus or server 30. The printer controller can be programmed to process data and control various other components of the multi-function peripheral to carry out the various methods described herein. In accordance with an exemplary embodiment, the operation of printer section commences when the printer section receives a page description from the one or more client computers 20 or the print management apparatus or server 30 via the network I/F 408 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of printers 40 consistent with exemplary embodiments of the disclosure include, but are not limited to, a multi-function peripheral (MFP), a laser beam printer (LBP), an LED printer, a multi-function laser beam printer including copy function.

Figure 5:
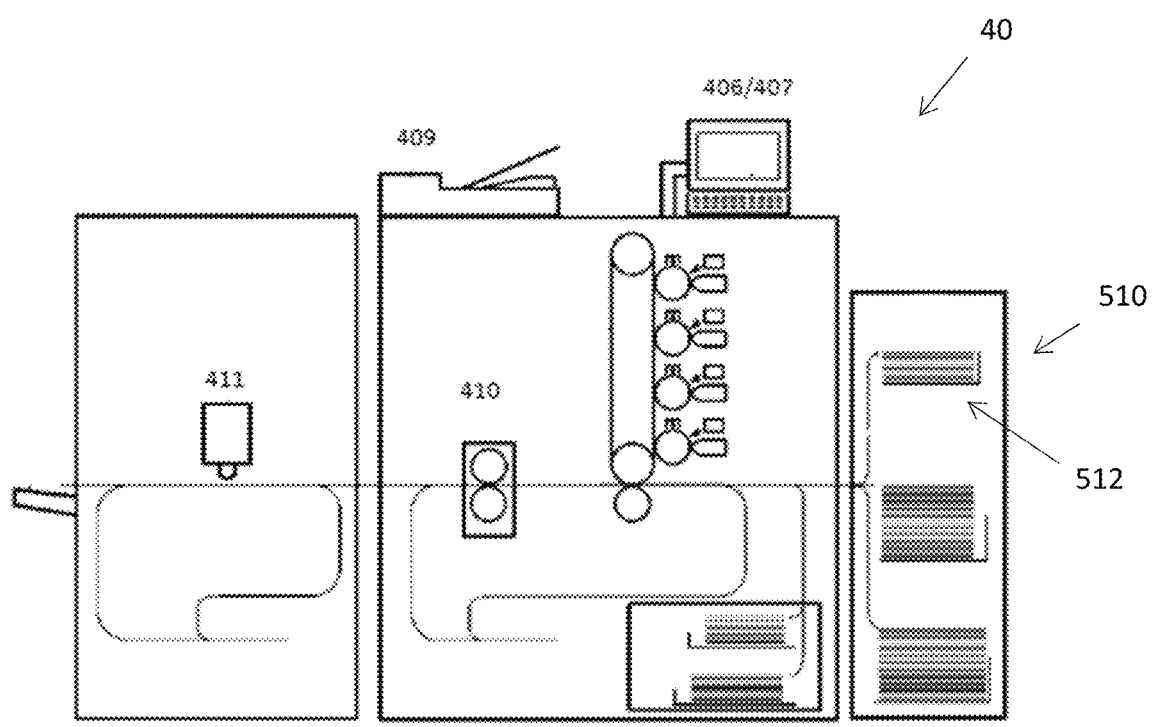
FIG. 5 is an illustration of an exterior of the printer or printing device as shown in FIG. 4.

FIG. 5 is an illustration of an exterior of the printer or printing device 40 as shown in FIG. 4. As shown in FIG. 5, the printer 40 can also include at least one auto tray or paper tray 510, and more preferably a plurality of auto trays or paper trays 510. Each auto tray or paper tray 510 can include a bin or tray, which holds a stack of a print media 512, for example, a paper or a paper-like product. The printer engine or print engine 410 has access to a print media 512 of various sizes and workflow for a print job, which can be, for example, stored in the input tray. A "print job" or "document" can be a set of related sheets, usually one or more collated copy sets copied from a set of original print job sheets or electronic document page images, from a particular user, or otherwise related.

In accordance with an exemplary embodiment, the print media 512 is preferably a paper or paper-like media having one or more print media attributes. The print media attributes can include, for example, paper color, coating, grain direction, printing technology, brightness, CIE, tint, whiteness, labColor, etc. In order to maximize print quality, the print media attributes of each type of print media should be input into or hosted on the printer 40, for example, on printer configuration settings of the printer 40 to obtain the highest quality output. Most print media 512 is provided in reams or other known quantities, which are packaged with indicia such as information on the manufacture, size, type and other attributes of the print media. In addition, most bundles or reams of paper include a UPC (Universal Product Code) or bar code, which identifies the type of print media including manufacture of the print media.

In accordance with an exemplary embodiment, the communication network or network 50 can be a public telecommunication line and/or a network (for example, LAN or WAN). Examples of the communication network 50 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

Figure 6:
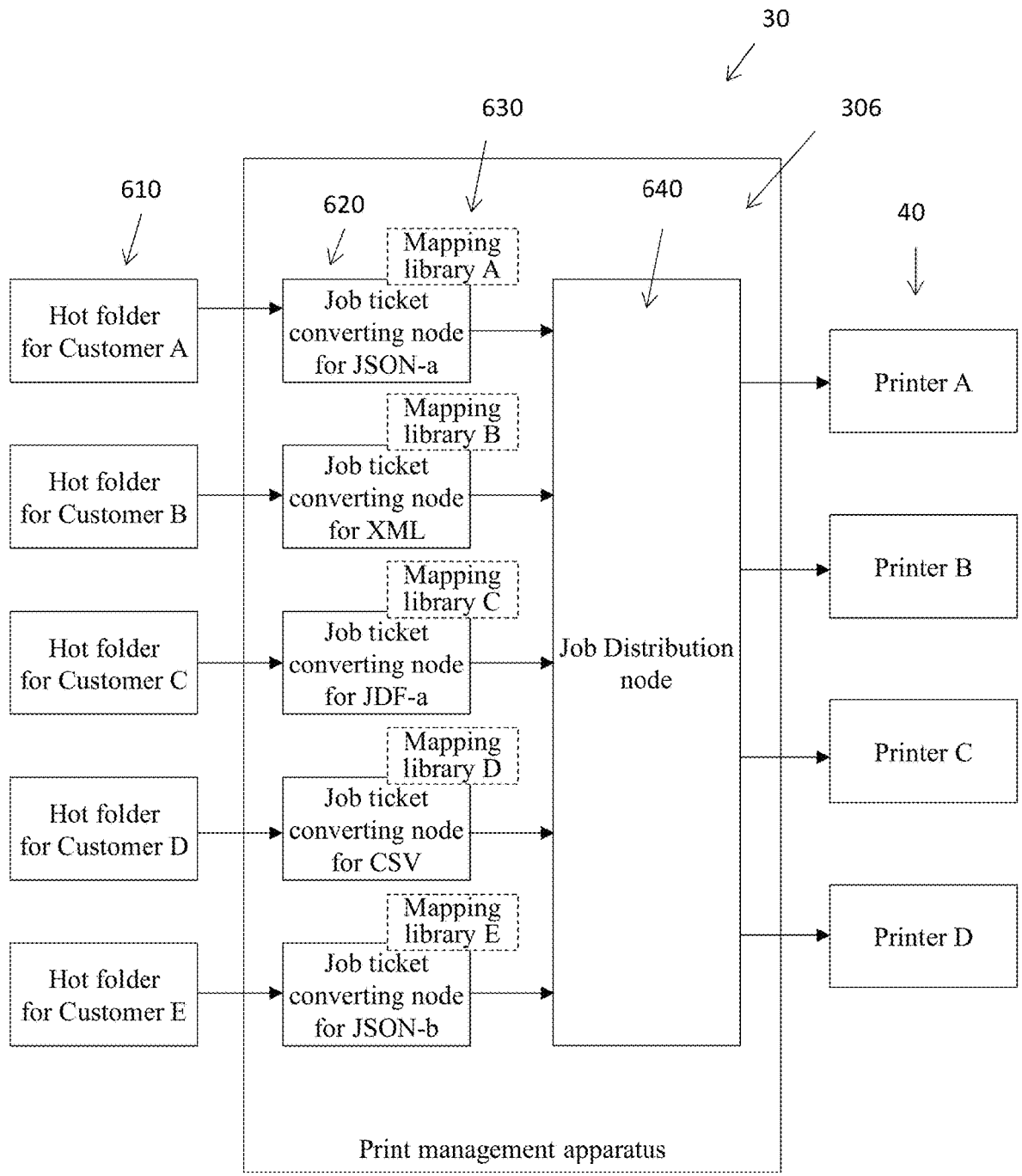
FIG. 6 is an illustration of the print management apparatus and a workflow in accordance with an exemplary embodiment.

FIG. 6 is an illustration of the print management apparatus 30 and a workflow in accordance with an exemplary embodiment. As shown in FIG. 6, the print management apparatus 30 receives the user print job ticket 60 from the client computer 20 of each customer 22, for example, via a plurality of corresponding hot folders 610. In accordance with an exemplary embodiment, each of the hot folders 610 can be a folder that is associated with a set of functions and settings registered as a program. The hot folders 610 receive the user print job ticket 60 and direct the user print job ticked 60 into a corresponding job ticket converting node 620. Each of the corresponding job ticket converting nodes 620 has a mapping library 630. In accordance with an exemplary embodiment, the user print job ticket 60 can be received, for example, from a web submission, e-mail attachments, and other known methods, rather than from a corresponding hot folder 610.

In accordance with an exemplary embodiment, each of the mapping libraries 630 (for example, Mapping library A . . . Mapping Library E) can be hosted in the memory 302 of the print management apparatus or server 30, for example, in the print management software 306. As disclosed above, each client computer 20 issues print job tickets 60 in a custom format. Accordingly, there can be one mapping library 630 for each client computer 20 (for example, one mapping library for each format, for example, JSON, XML, JDF, CSV). Each of the mapping libraries 630 can include multiple mapping objects. In accordance with an exemplary embodiment, for example, for each user print parameter found in a user print job ticket 60 issued by the client computer 20 can have a corresponding mapping object. For example, Mapping library A 630 corresponds to client computer A. In accordance with an exemplary embodiment, for example, Mapping library A 630 can include a mapping object for each user print parameter that might be found in a print job ticket issued by client computer A 20.

As discussed above, each user print parameter found in a user print job ticket 60 may correspond to a native print parameter. Moreover, a user value for the user print parameter may be mapped to a native value for the native print parameter. In accordance with an exemplary embodiment, the mapping object for a user print parameter specifies the one or more native print parameters corresponding to the user print parameter. Further, the mapping object for the user print parameter can also provide the mapping between a user value for the user print parameter and a native value for the corresponding native print parameter.

In accordance with an exemplary embodiment, as shown in FIG. 6, the print management software 306 can include a job distribution node 640, which receives the native print job tickets 70 from each of the corresponding Job ticket converting nodes 620 and distributes the native print job tickets 70 to one or more of the printers 40. In accordance with an exemplary embodiment, the job ticket converting node 620 can be configured to generate a native print job ticket 70 based on a user print job ticket 60. For example, the job ticket converting node 620 generates the native print job ticket 70 based on the user print job ticket 60. Generating the native print job ticket 70 can include accessing the mapping library 630, and for each user print parameter in the user print job ticket, determining the one or more corresponding native print parameters from the mapping object in mapping library 630 for the user print parameter. The user print job ticket 60 can also include a user value for each user print parameter.

In accordance with an exemplary embodiment, generating the native print job ticket 70 can also include determining, from the mapping object, the native value that maps to the user value. The native print job ticket 70 can include the determined native print parameters and determined native values for the native print parameters. However, in accordance with an exemplary embodiment, the user print parameters can be excluded from (for example, not included in) the native print job ticket 70. As discussed above, the native print parameters and determined native values form instructions that can be interpreted/executed by the printers 40.

In accordance with an exemplary embodiment, generating the native print job ticket 70 can include converting the user print job ticket 60 by swapping the user print parameters and user values in the user print job ticket 60 with the appropriate native print parameters and native values. Those skilled in the art, having the benefit of this detailed description, will appreciate that as new print job ticket formats are added and/or as existing print job ticket formats are updated, the print manager software code 306 will not need to be changed.

In accordance with an exemplary embodiment, the number of mapping libraries 630 and/or the content of the mapping libraries 630 can change to reflect the new formats and/or updates to existing formats. In accordance with an exemplary embodiment, the user print job ticket 60 can include content (for example, text, graphics, clipart, etc.) to be printed. In such scenarios, the content from the user print job ticket 60 may be included in the native print job format. Additionally or alternatively, the content to be printed can be sent separately from the user print job ticket 60.

Figure 7:
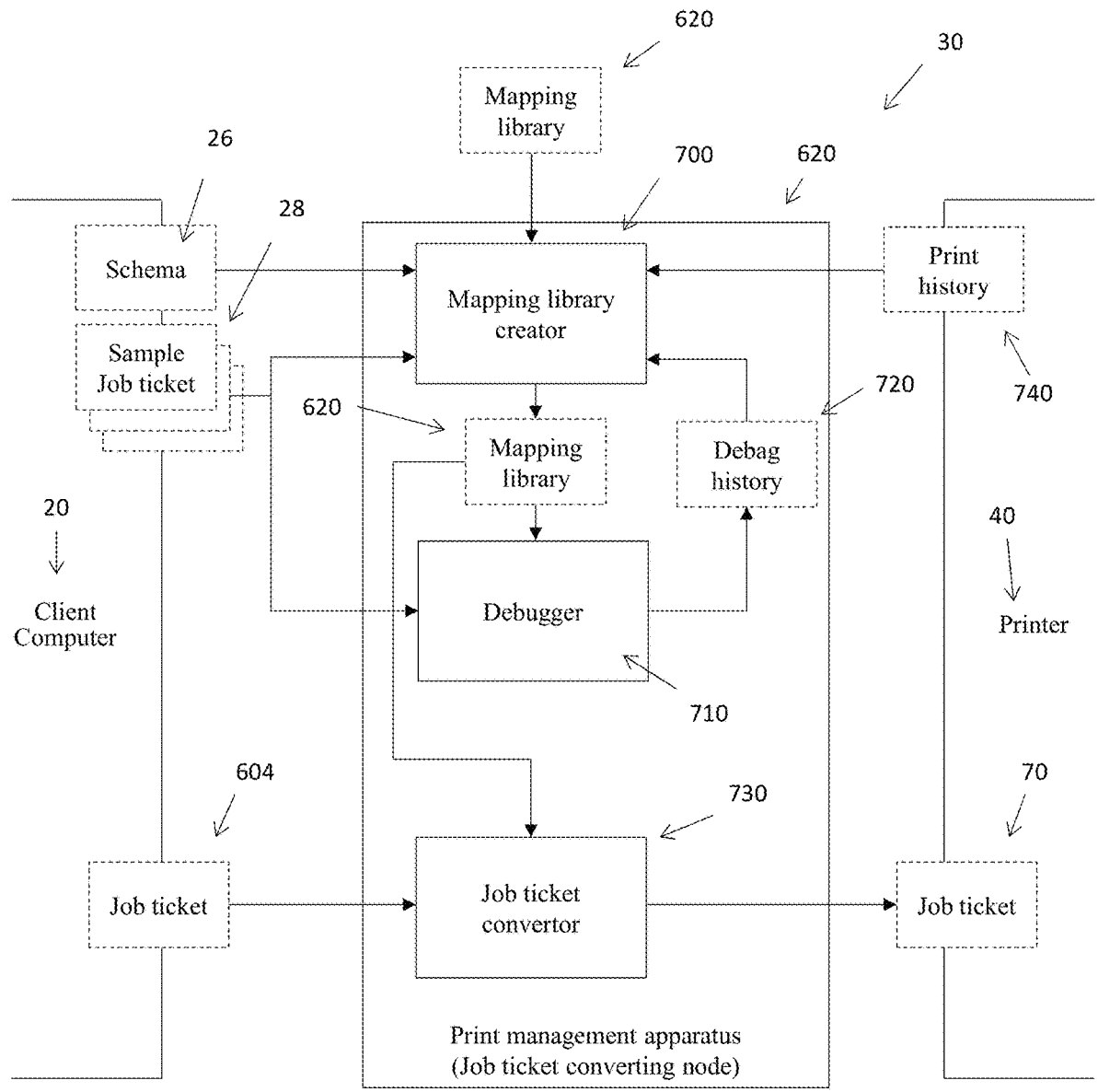
FIG. 7 is an illustration of a job ticket converting node of the print management apparatus in accordance with an exemplary embodiment.

FIG. 7 is an illustration of a ticket converting node 620 of the print management apparatus 30 in accordance with an exemplary embodiment. As shown in FIG. 7, initially, the user print job ticket 60 is received by the print management apparatus or server 30 from the client computer 20. The user print job ticket 60 can include one or more user print parameters and user values for the user print parameters. The user print parameters and the user values form instructions for printing one or more print jobs (for example, number of copies, stapling, two-sided printing, etc.). However, as the names of the user print parameters might be user-specific, printers might not be able to interpret/execute the instructions in the user print job ticket, and thus might not correctly print the one or more print jobs. In accordance with an exemplary embodiment, each user print parameter may be classified as a simple-type print parameter, a normal-type print parameter, or a complex-type print parameter. The user print job ticket may have zero or more simple-type print parameters, zero or more normal-type print parameters, and zero or more complex-type print parameters as disclosed herein.

In addition, as shown in FIG. 7, in accordance with an exemplary embodiment, one or more sample print job tickets 28 having a schema 26 can be received from a source (for example, a customer or user 22 or user or customer client computer 20) into a mapping library creator 700 on the print management apparatus 30. The mapping library creator 700 can include a graphical user interface (GUI) 1000 (FIGS. 10-21) as disclosed herein to assist with creating the mapping libraries 630. Each of the sample print job tickets 28 can be in a source specific format. For example, each sample print job ticket 28 can include one or more user print parameters. For example, in accordance with an exemplary embodiment, the one or more user print parameters can comprise a part of a plurality of user items and user values. In accordance with an exemplary embodiment, the sample print job tickets 28 may not be destined for a printer 40. Instead, for example, the sample print job tickets 28 can be only issued for the generation of a mapping library 630. In accordance with an exemplary embodiment, the mapping library 630 can be created from an actual job ticket (for example, not a sample print job ticket) destined for a printer 40.

In accordance with an exemplary embodiment, the schema 26 and sample job tickets 28 are fed into the mapping library creator 700 to generate one or more mapping libraries 630 as disclosed herein. In addition, the sample job tickets 28 can be fed into a debugger 710, which can be a computer program configured to test and debug the sample Job tickets 28. The debugger 710 can produce a debug history 720, which can be, for example, a listing of specific errors or detects found in the sample job tickets 28.

In accordance with an exemplary embodiment, the mapping library creator 700 will also receive or obtain a print job history (or print history) 740 from one or more printers 40. The print job history 740 can include an indication whether a print job was successfully executed using a job ticket 70 that was previously created by the job ticket converting node 620. In accordance with an exemplary embodiment, as disclosed herein, the print job history 740 can be displayed, for example, on a graphical user interface (GUI) (or display unit) 304 of the print management apparatus 30 to allow a user to associate the user values to be used to execute a print job. For example, at least one of the user values and/or at least one of the target values that was used for a successful print job can be shown in a different appearance from other user values and/or target values on the graphical user interface (GUI) 1000 (FIG. 10) as disclosed herein.

As shown in FIG. 7, the job ticket converting node 620 also includes a job ticket converter 730, which is configured to convert the user print job ticket 60 into the native print job ticket 70. In accordance with an exemplary embodiment, a native print parameter in the native print job ticket 70 can be determined for a simple-type print parameter, a normal-type print parameter, or a complex-type print parameter in the user print job ticket 60. This can include selecting a mapping library 630 and then identifying, within the mapping library 630, a mapping object for the simple-type, the normal-type, or complex-type print parameter. The mapping library 630 may be selected based on the source (for example, customer or user 22, or user client computer 20) that issued the user print job ticket 60. In accordance with an exemplary embodiment, the mapping object specifies the native print parameter that corresponds to the simple-type, the normal-type, or complex-type print parameter. Moreover, as this is a simple type, the normal-type, or complex-type print parameter, the mapping object specifies that the native value for the native print parameter is equal to the user value, as specified in the user print job ticket, for the simple-type, the normal-type, or complex-type print parameter. In accordance with an exemplary embodiment, this process can be repeated for each simple-type, the normal-type, or complex-type print parameter in the user print job ticket. However, subsequent iterations may not need to select the mapping library 630 since the mapping library 630 corresponding to the customer 22 or client computer 20 and corresponding user print job ticket 60 has already been selected. In accordance with an exemplary embodiment, this process may be omitted, if the user print job ticket does not include any simple-type, the normal-type, or complex-type print parameters.

In accordance with an exemplary embodiment, a native print job ticket 70 can be generated based on the user print job ticket 60. The native print job ticket 70 can include the determined native print parameters and the determined native values for the native print parameters. However, the native print job ticket 70 does not include the user print parameters. In accordance with an exemplary embodiment, the native print job ticket 70 is generated by swapping the user print parameters and the user values in the user print job ticket with the determined native print parameters and native values. If the user print job ticket includes content (for example, text, graphics, clipart, etc.) to be printed, the native print job ticket might also include the content. The native print job ticket 70 can be sent to a printer 40, and the printer 40 prints the jobs based on the native print job ticket 70.

Figure 8:
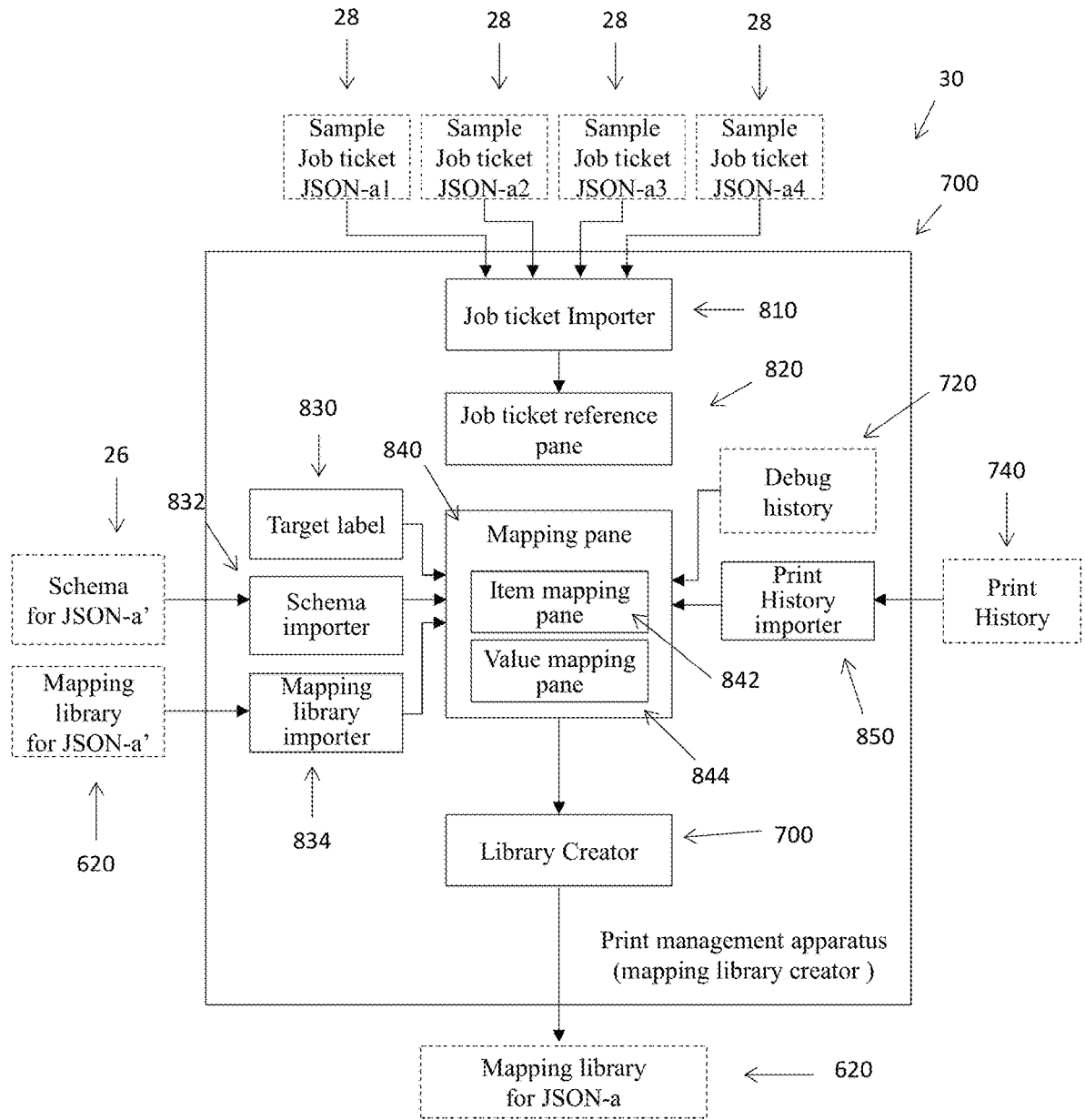
FIG. 8 is an illustration of a mapping library creator of the print management apparatus in accordance with an exemplary embodiment.

FIG. 8 is an illustration of the mapping library creator 700 of the print management apparatus 30 in accordance with an exemplary embodiment. As shown in FIG. 8, the mapping library creator 700 can include a job ticket importer 810, which can be configured to receive, for example, a plurality of sample Job tickets 28. The mapping library creator 700 can also include a job ticket reference pane 820, which can be a graphical user interface (GUI) window as shown, for example, in FIGS. 10-21. In accordance with an exemplary embodiment, the job ticket reference pane 820 can be configured to display the plurality of user items and user values received from one or more of the sample job tickets 28. In accordance with an exemplary embodiment, the sample Job tickets 28 can be received from, for example, a job ticket importer 810.

As shown in FIG. 8, the mapping library creator 700 can also include a target label 830, a schema importer 832, which is configured to receive Schema 26 for one or more user print job tickets 60, and a mapping library importer 834, which is configured to receive information from the mapping library 630 for the corresponding Schema 26 of the user print job tickets 60. In accordance with an exemplary embodiment, the schema 26 for each the print job tickets 60 can be used to generate the input, for example, the plurality of user items and user values in the job ticket reference pane 820. The target label 830, the schema 26 for one or more user print job tickets 60, and the information form the mapping library importer 834 can be fed into a mapping pane 840 (or graphical user interface (GUI) window 1000), which can include an item mapping pane 842 and a value mapping pane 844 (FIGS. 10-21). In accordance with an exemplary embodiment, the print history 740 can be fed into mapping pane 840 via a print history importer 850. In addition, the mapping pane 840 can include the debug history 720 as described in connection with FIG. 7. In accordance with an exemplary embodiment, the mapping pane 840 is connected to the mapping library creator 700, which generates the mapping library 630 as disclosed herein.

Figure 9:
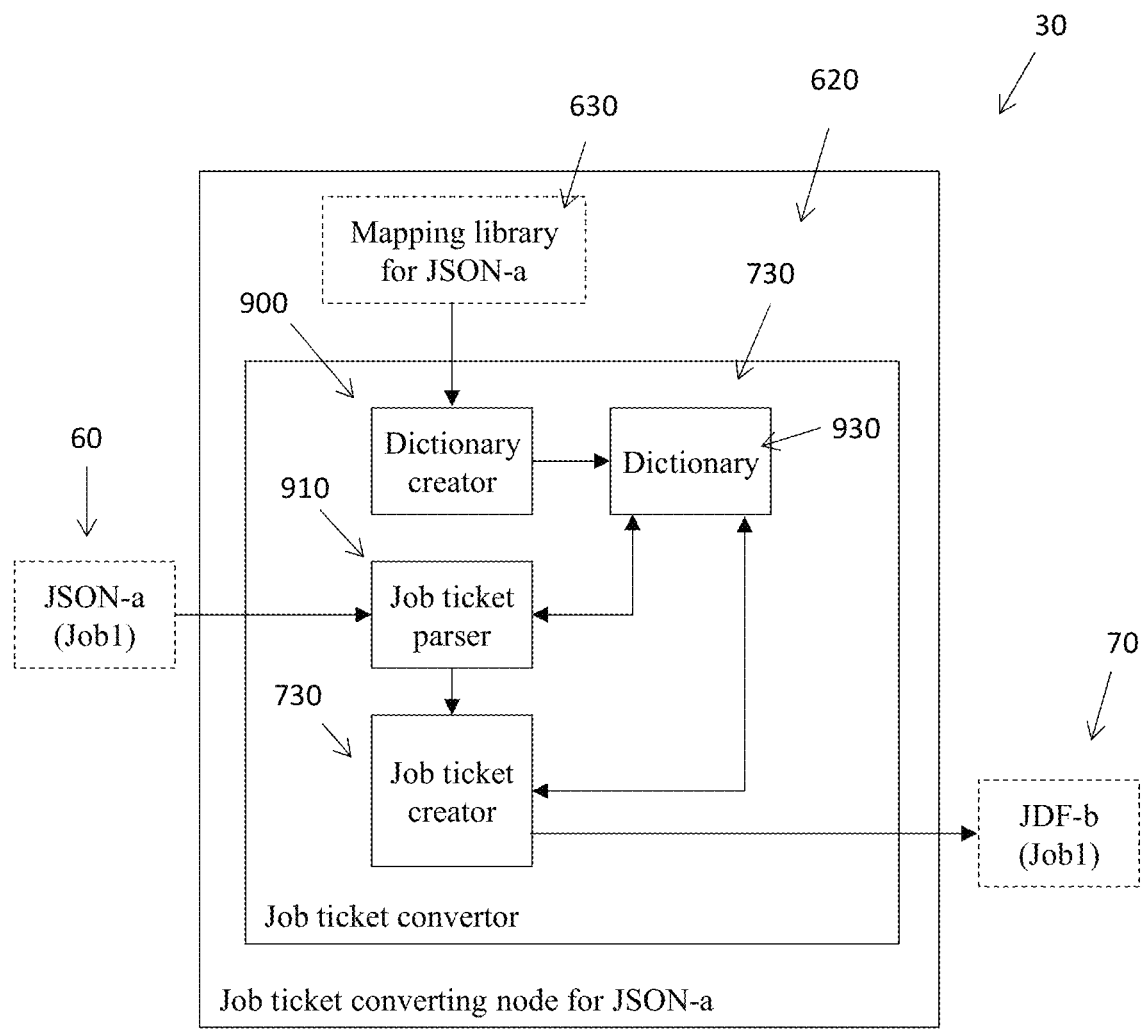
FIG. 9 is an illustration of a converting process or node of the job ticket convertor in accordance with an exemplary embodiment.

FIG. 9 is an illustration of a converting process or node 620 of the job ticket convertor 730 in accordance with an exemplary embodiment. As shown in FIG. 9, a job ticket parser 910 within the job ticket convertor 730 receives the user print job ticket 60 from the client computer 20. The Job ticket parser 910 is communication with a print job dictionary (or dictionary 930). The print job dictionary 930 communicates with a dictionary creator 900, which receives input from the mapping library 630. Generating the native print job ticket 70 can include accessing the print job dictionary 930 to determine one or more native print parameters and one or more native values that correspond to each user print parameter and user value in the user print job ticket 60. In accordance with an exemplary embodiment, the job ticket creator 730 receives the parsed user print job ticket 60 from the Job ticket parser 910, and based on the print job dictionary 930 generates the native print job ticket 70 as disclosed herein. Once the native print job ticket 70 has been created, the native print job ticket 70 can be sent to a print shop 14 having one or more printers 40 for printing.

In accordance with an exemplary embodiment, the print management software 306 can include a mapping library 630 for each of the one or more customers 22 and/or corresponding client computers 20, which produce or generate the user print job ticket 60. The mapping library 630 can be used with a dictionary creator (dictionary engine) 900 to generate the print job dictionary 930. The dictionary creator 900 helps convert the print job ticket 60 to the native job ticket 70. In accordance with an exemplary embodiment, with the functionality of the mapping library creator 700 as shown in FIGS. 10-21 and disclosed herein, an operator may drag a user print parameter (or original item)) from a list of user print parameters and drop the user print parameter in the table next to the corresponding native print parameter (or target item). If the user print parameter corresponds to multiple native print parameters, the operator may drop the user print parameter next to one of the corresponding native print parameters, and then augment the table (discussed below) to include the additional corresponding native print parameters adjacent to the dropped user print parameter.

In accordance with an exemplary embodiment, it can be through these drag and drop and augment operations as shown in FIGS. 10-21 that the mapping library 630 (and corresponding tables) can be populated and wherein relationships between each user print parameter and one or more corresponding native print parameters are formed. In accordance with an exemplary embodiment, the mapping libraries 630 (and corresponding tables) may be stored in any format (for example, XML format).

Figure 10:
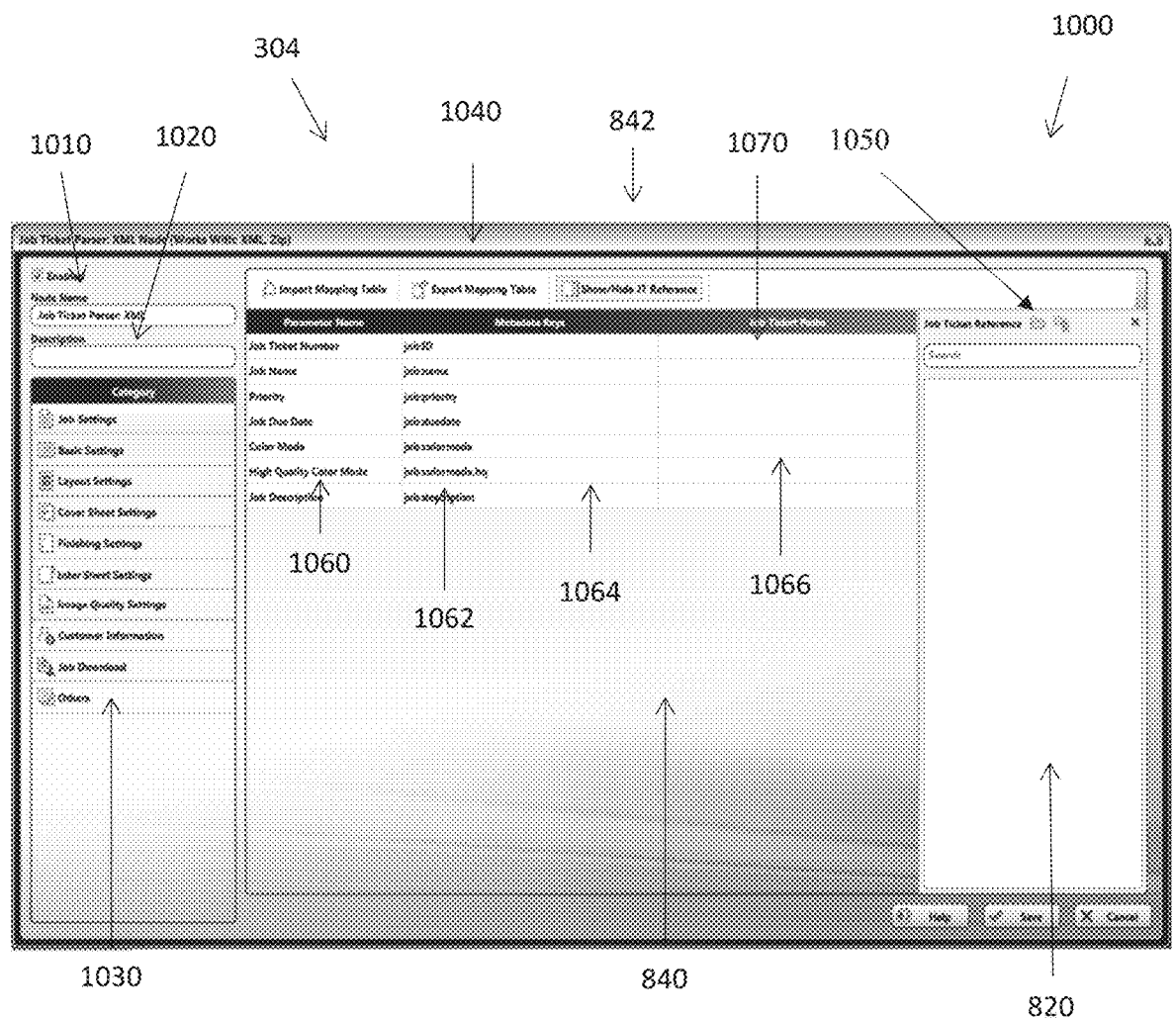
FIG. 10 is an illustration of a graphical user interface (or GUI) in accordance with an exemplary embodiment.

FIG. 10 is an illustration of a mapping pane 840 in the form of a graphical user interface (or GUI) 1000 of the mapping library creator 700, which can be displayed on the display unit 304 of the print management apparatus 30 in accordance with an exemplary embodiment. As shown in FIG. 10, GUI 1000 may include node name 1010, a description section 1020, a category listing 1030, and the mapping pane 840. In accordance with an exemplary embodiment, the mapping pane 840 can include the item mapping pane 842, which can include folder or icons directed to import mapping tools, export mapping tools, and show/hide/JT reference. In accordance with an exemplary, the user can import plural (or a plurality of) sample job tickets 28 using job ticket reference icon 1050. As shown in FIG. 10, the item mapping pane 842 can include, for example, parameter names 1060, metadata keys 1062, an input for native print parameters (or metadata keys) 1064, and a job ticket path 1066 (i.e., listing of user print parameters) having a drop region 1070.

Figure 11:
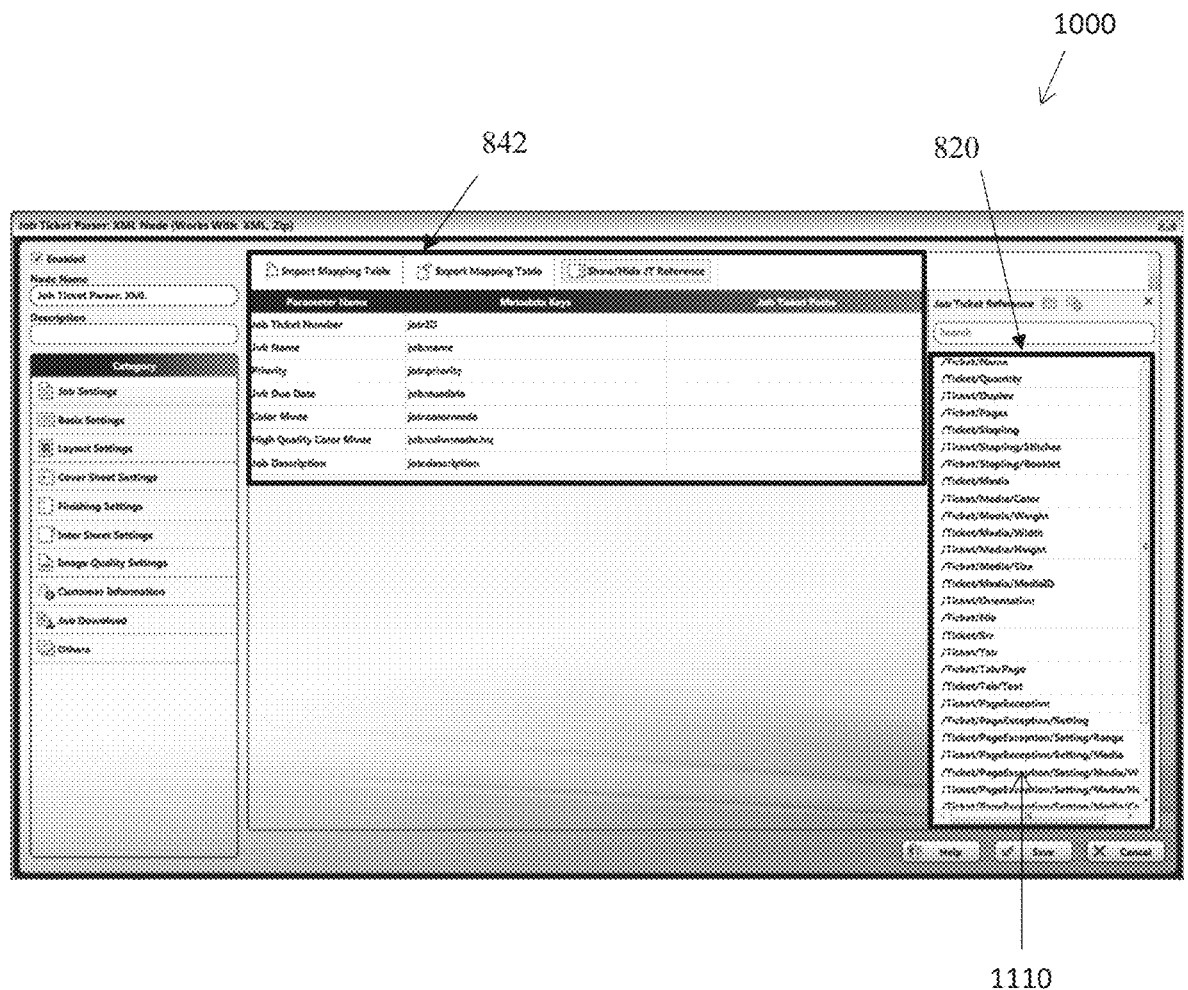
FIG. 11 is an illustration of a graphical user interface (or GUI) in accordance with an exemplary embodiment.

FIG. 11 is an illustration of a graphical user interface (or GUI) 1000 in accordance with an exemplary embodiment. As shown in FIG. 11, the GUI 1000 can include the item mapping pane 842 and a job ticket reference pane 820. In accordance with an exemplary embodiment, the job ticket reference pane 820 shows print setting items (or original items) 1110 that have been extracted from the imported sample job tickets 28. In accordance with an exemplary embodiment, the job ticket reference pane 820 can show or illustrate the original items 1110 while avoiding a duplication of the same items even if plural sample job tickets include the same item(s). In accordance with an exemplary embodiment, the print setting items (or original items) 1110 can include, for example, print parameters, such as quantity, duplex, pages, stapling, stapling/stiches, booklet, type of media, media color, media weight, media width, media height, orientation, file, SRC, tab, page exception, etc.

Figure 12:
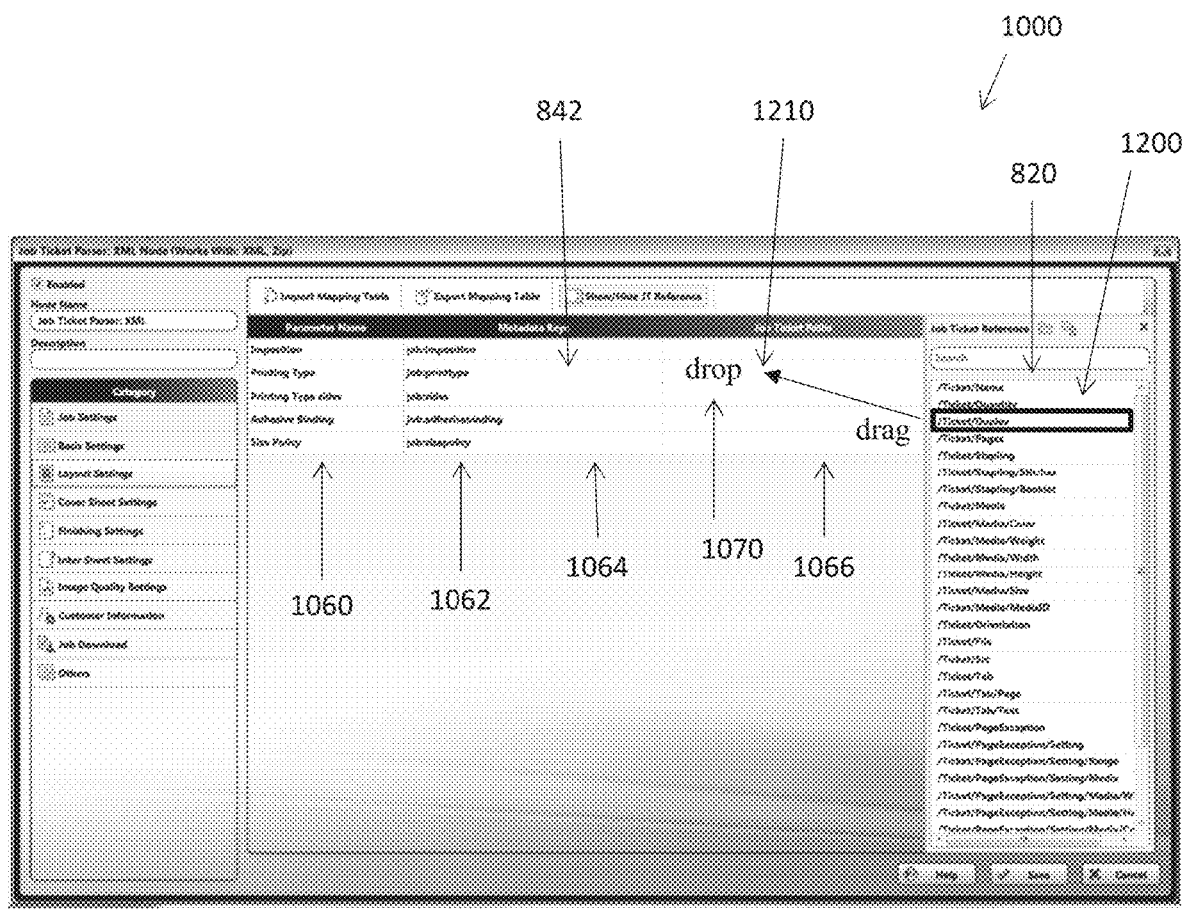
FIG. 12 is an illustration of a graphical user interface (or GUI) in accordance with an exemplary embodiment.

FIG. 12 is an illustration of a graphical user interface (or GUI) 1000 in accordance with an exemplary embodiment. As shown in FIG. 12, a user can associate an original item 1200 with a corresponding item that is used in a print shop (target item 1210, for example, a native print parameter) by dragging the original item 1200 from the job ticket reference pane 820 and dropping the original item 1200 at a position corresponding to the target item 1210 in the item mapping pane 842. It is through the drag-drop operations that the item mapping pane 842 is populated and that relationships (for example, mappings) between each original item (user print parameter) 1200 and one or more corresponding target item (native print parameters) 1210 can be formed.

Figure 13:
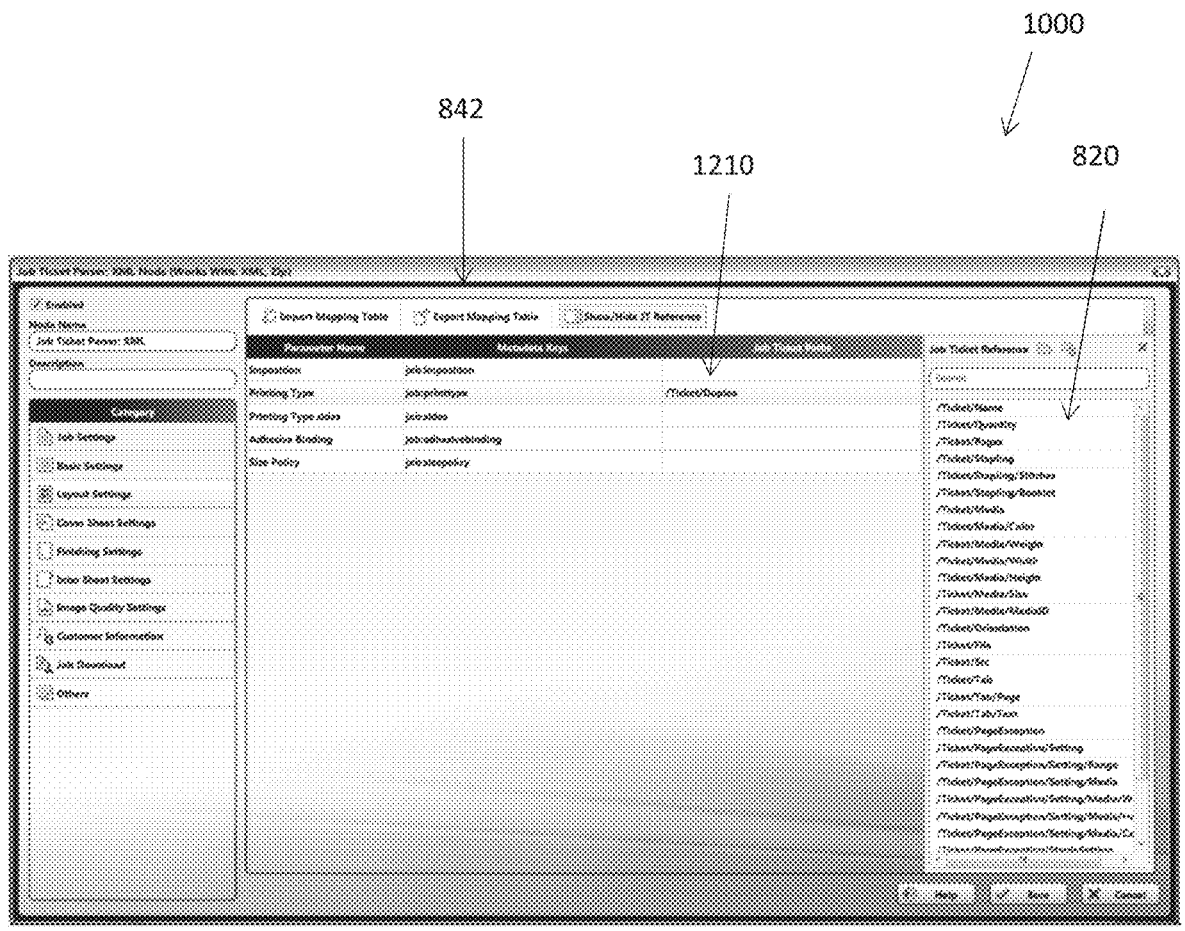
FIG. 13 is an illustration of a graphical user interface (or GUI) in accordance with an exemplary embodiment.

FIG. 13 is an illustration of a graphical user interface (or GUI) 1000 in accordance with an exemplary embodiment. As shown in FIG. 13, after the original item 1200 is associated with the target item 1210 in the item mapping pane 842, the original item 1200 disappears from the job ticket reference pane 820.

Figure 14:
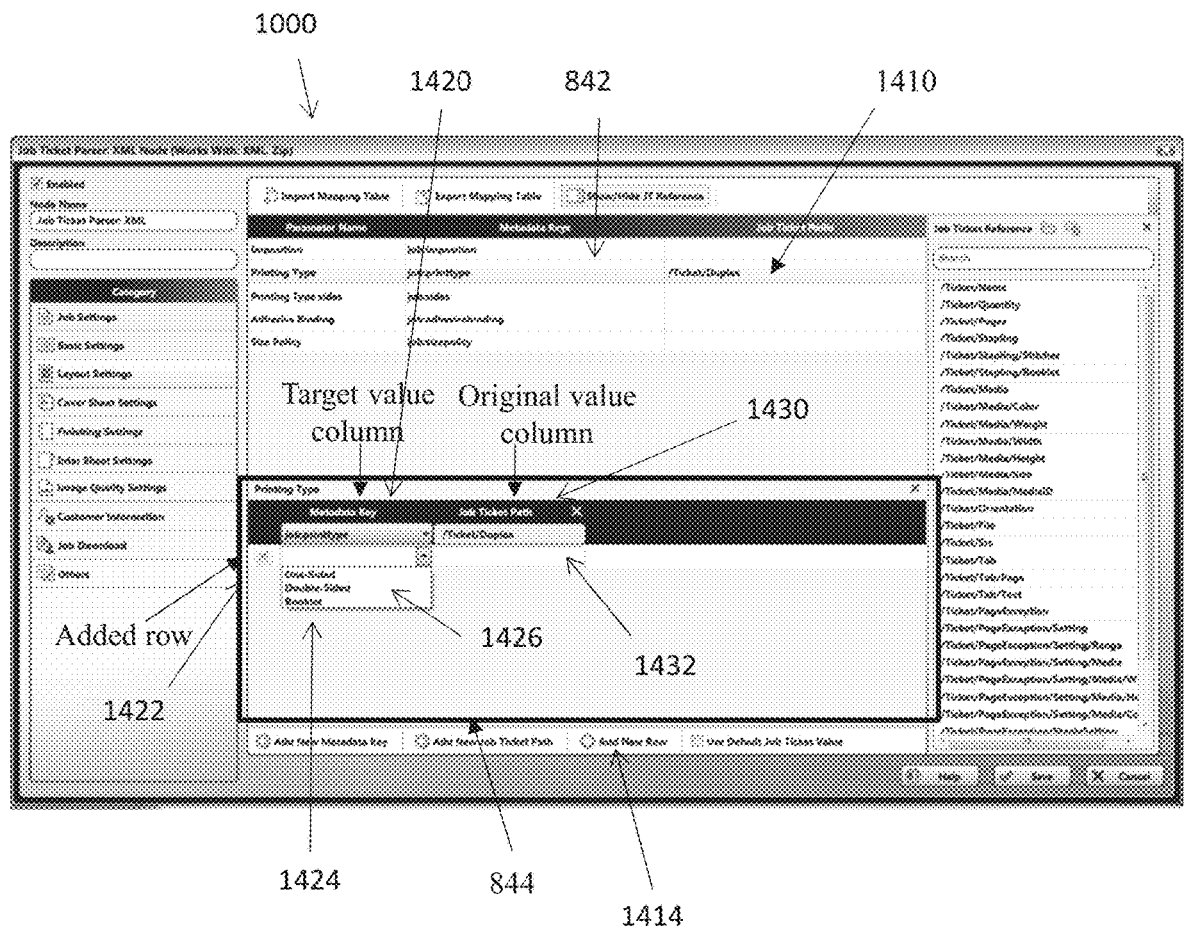
FIG. 14 is an illustration of a graphical user interface (or GUI) in accordance with an exemplary embodiment.

FIG. 14 is an illustration of a graphical user interface (or GUI) 1000 in accordance with an exemplary embodiment having a value mapping pane 844. In accordance with an exemplary embodiment, as shown in FIG. 14, for example, when a user clicks a row 1410 (for example, which includes a combination of an original item 1200 and a target item 1210) in item mapping pane 842, the value mapping pane 844 will appear. In the accordance with an exemplary embodiment, the clicking of the row 1410 is preferably a single click, however, it can be a double click. In accordance with an exemplary embodiment, when the present target item 1210 is a simple type, a user does not need to do any additional steps or actions in the value mapping pane 844, however, the user can also check "Use Default Job Ticket Value" that causes the same result as doing nothing, i.e., that taking no action.

In accordance with an exemplary embodiment, when the present target item 1210 is a normal-type or a complex-type print parameter, the user can click "Add New Row" 1414 in order to add a new row in the value mapping pane 844. In accordance with an exemplary embodiment, when the user clicks a target value column 1420 in the added row 1422, a dropdown menu that includes selectable target values 1424 (that are defined in a target label data, for example, one-sided, double-sided, or booklet) appears. The user can select a target value 1426 (one target value) to be associated with an original value from the dropdown menu 1432 in the original value column 1430.

Figure 15:
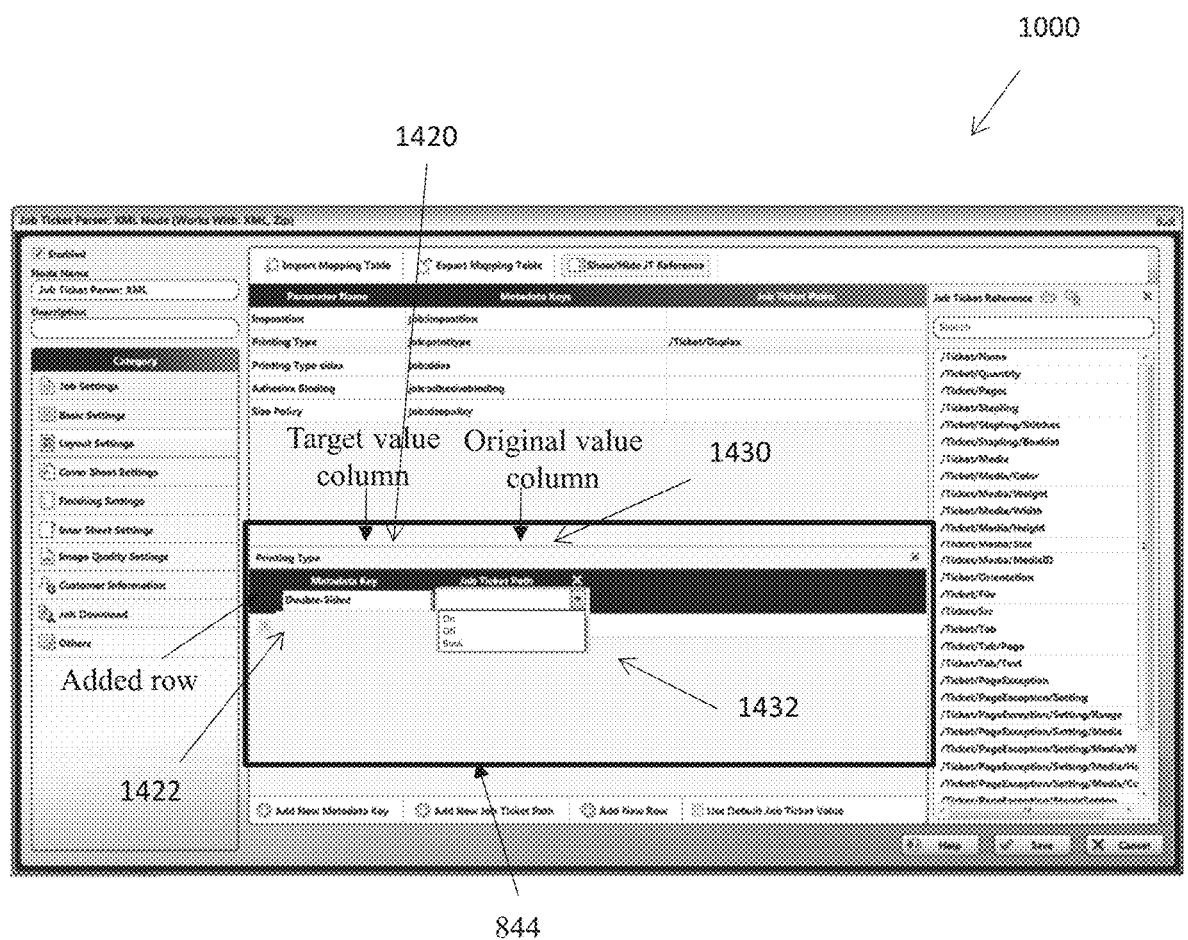
FIG. 15 is an illustration of a graphical user interface (or GUI) in accordance with an exemplary embodiment.

FIG. 15 is an illustration of a graphical user interface (or GUI) 1000 in accordance with an exemplary embodiment. As shown in FIG. 15, when the user clicks the original value column 1430 in the added row 1422, the dropdown menu 1432 with selectable original values, which are defined in schema data appears. The user can then select one original value to be associated with the target value from the dropdown menu 1424. In accordance with an exemplary embodiment, the user can repeat, as necessary, the pre-described operations.

Figure 16A:
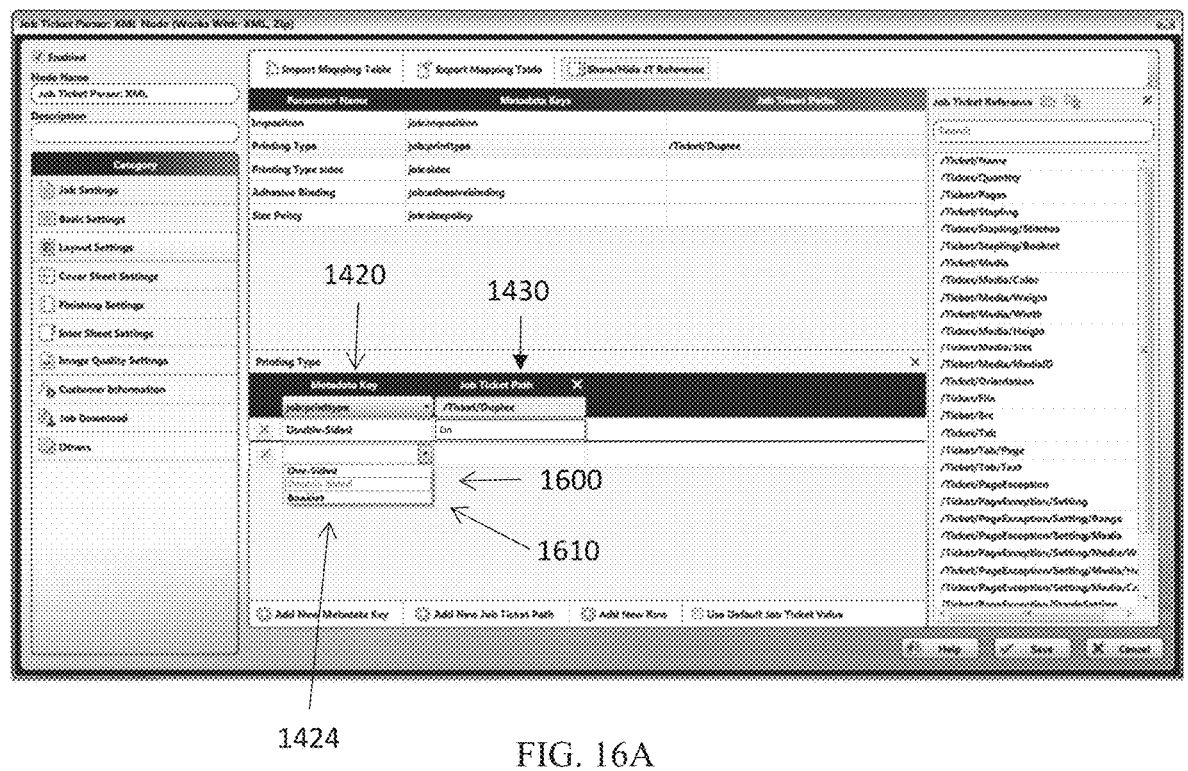
FIG. 16A is an illustration of a graphical user interface (or GUI) in accordance with an exemplary embodiment.

FIG. 16A is an illustration of a graphical user interface (or GUI) 1000 in accordance with an exemplary embodiment. As shown in FIG. 16A, in the dropdown menu 1424, a target value 1600 that has been associated with an original value is shown in a different appearance from other target values 1610 that has not yet been associated with any original values 1430. In addition, the target value(s) 1610 that has been associated with an original value 1430 may disappear from the dropdown menu 1424.

Figure 16B:
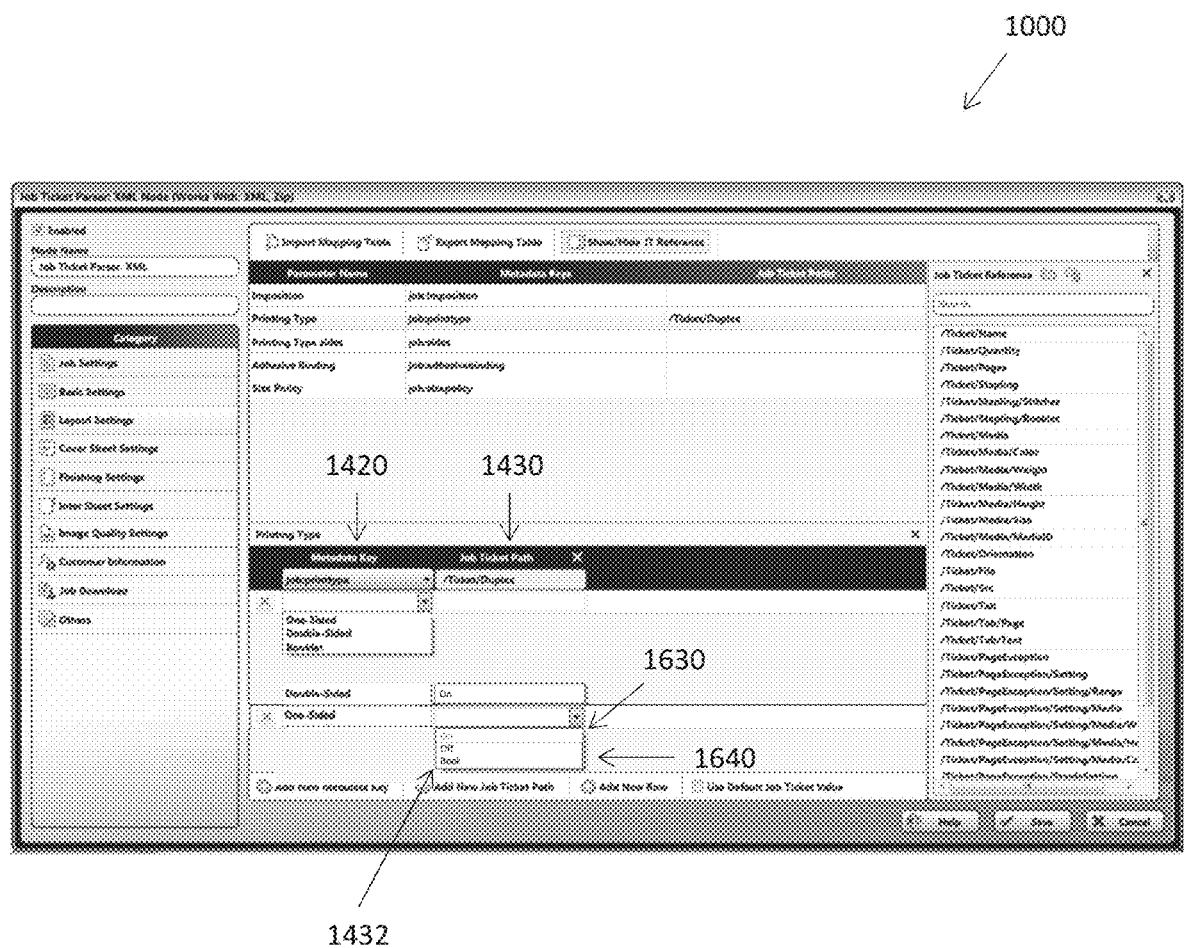
FIG. 16B is an illustration of a graphical user interface (or GUI) in accordance with an exemplary embodiment.

FIG. 16B is an illustration of a graphical user interface (or GUI) 1000 in accordance with an exemplary embodiment. As shown in FIG. 16B, a similar control as disclosed in FIG. 16A to the one described above can be applied to original values 1430. For example, as shown in FIG. 16B, in the dropdown menu 1432, an original value 1630 that has been associated with a target value can be shown in a different appearance from other original values 1640 that have not yet been associated with any target values 1420. For example, in accordance with an exemplary embodiment, the different appearance can be a change in color of the row and/or column. In addition, the original value(s) 1630 that have been associated with a target value 1420 can disappear from the dropdown menu 1432.

Figure 17:
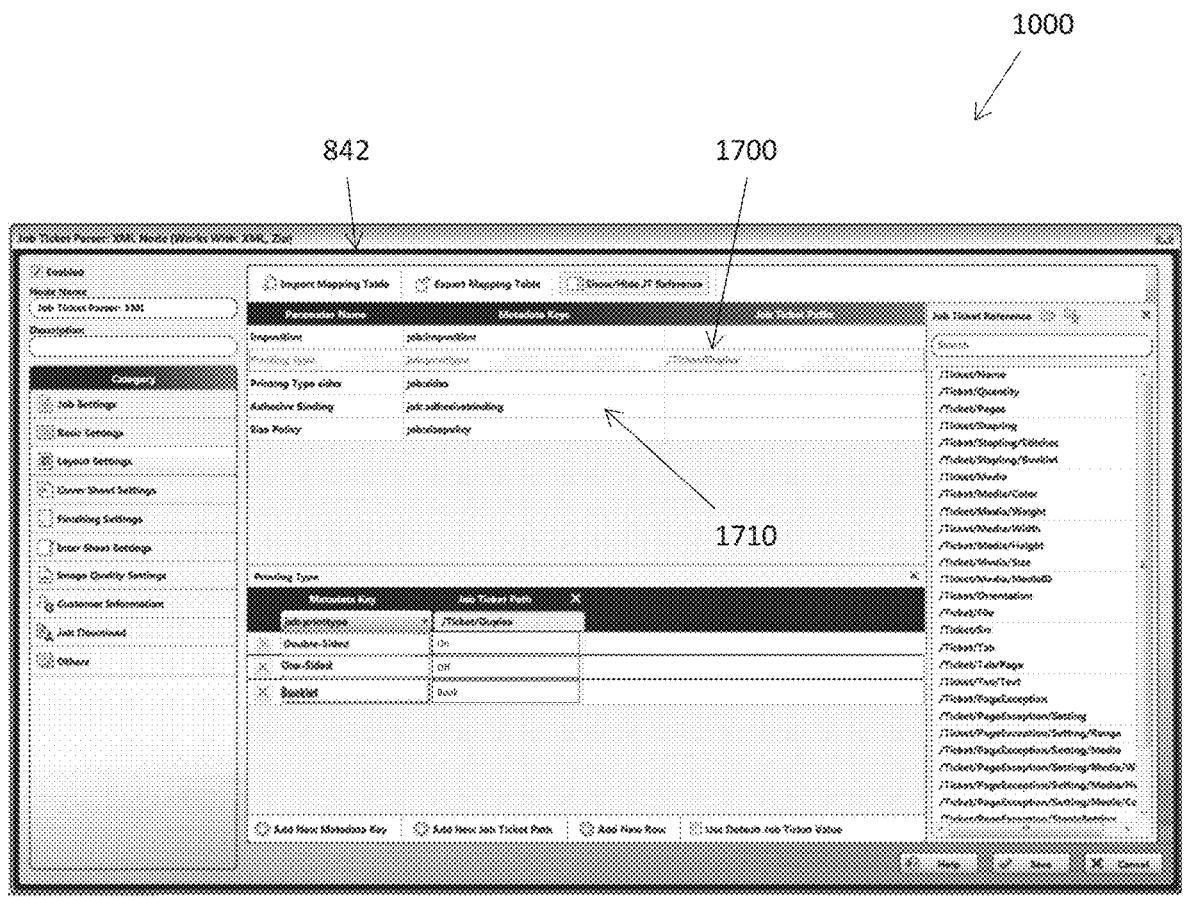
FIG. 17 is an illustration of a graphical user interface (or GUI) in accordance with an exemplary embodiment.

FIG. 17 is an illustration of a graphical user interface (or GUI) 1000 in accordance with an exemplary embodiment. As shown in FIG. 17, in accordance with an exemplary embodiment, a target item 1700 in which all target values have been associated with original value can be shown in a different appearance from others target items 1710 in the item mapping pane 842, which have not yet been associated with an original value. For example, in accordance with an exemplary embodiment, the different appearance(s) can be a change in color of the row and/or column.

Figure 18:
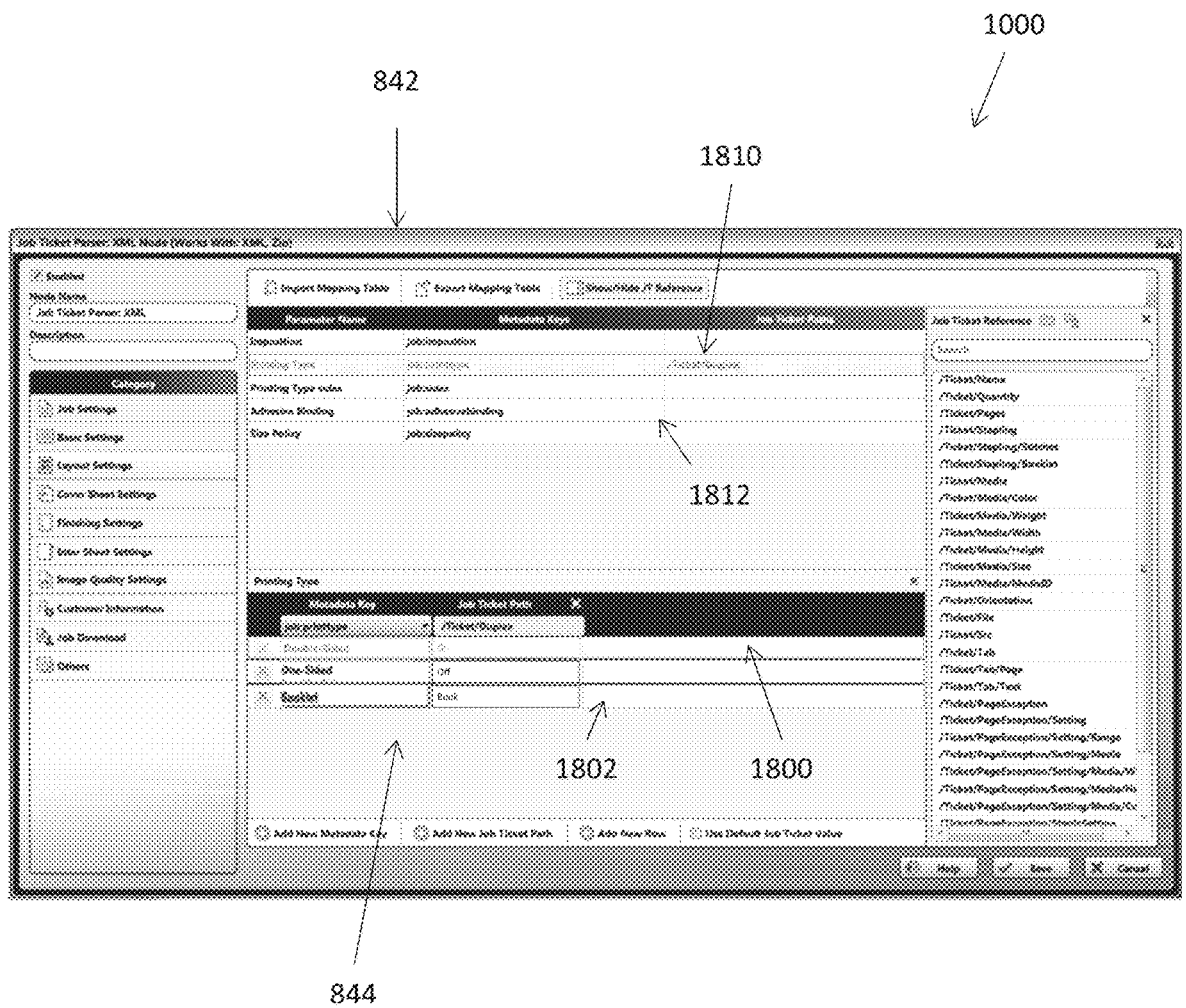
FIG. 18 is an illustration of a graphical user interface (or GUI) in accordance with an exemplary embodiment.

FIG. 18 is an illustration of a graphical user interface (or GUI) 1000 in accordance with an exemplary embodiment. As shown in FIG. 18, a combination 1800 of a target value and original that has been used in a successful print job can be shown in a different appearance from others 1802 in the value mapping pane 844. In accordance with another exemplary embodiment, a similar control to the one described above can be applied to a combination 1810 of a target value and original that has been debugged by using a debug function as compared to the combination 1812 of the target value and the original value, which has not yet been debugged, for example, as shown in the item mapping pane 842. For example, in accordance with an exemplary embodiment, the different appearance(s) can be a change in color of the row and/or column.

Figure 19:
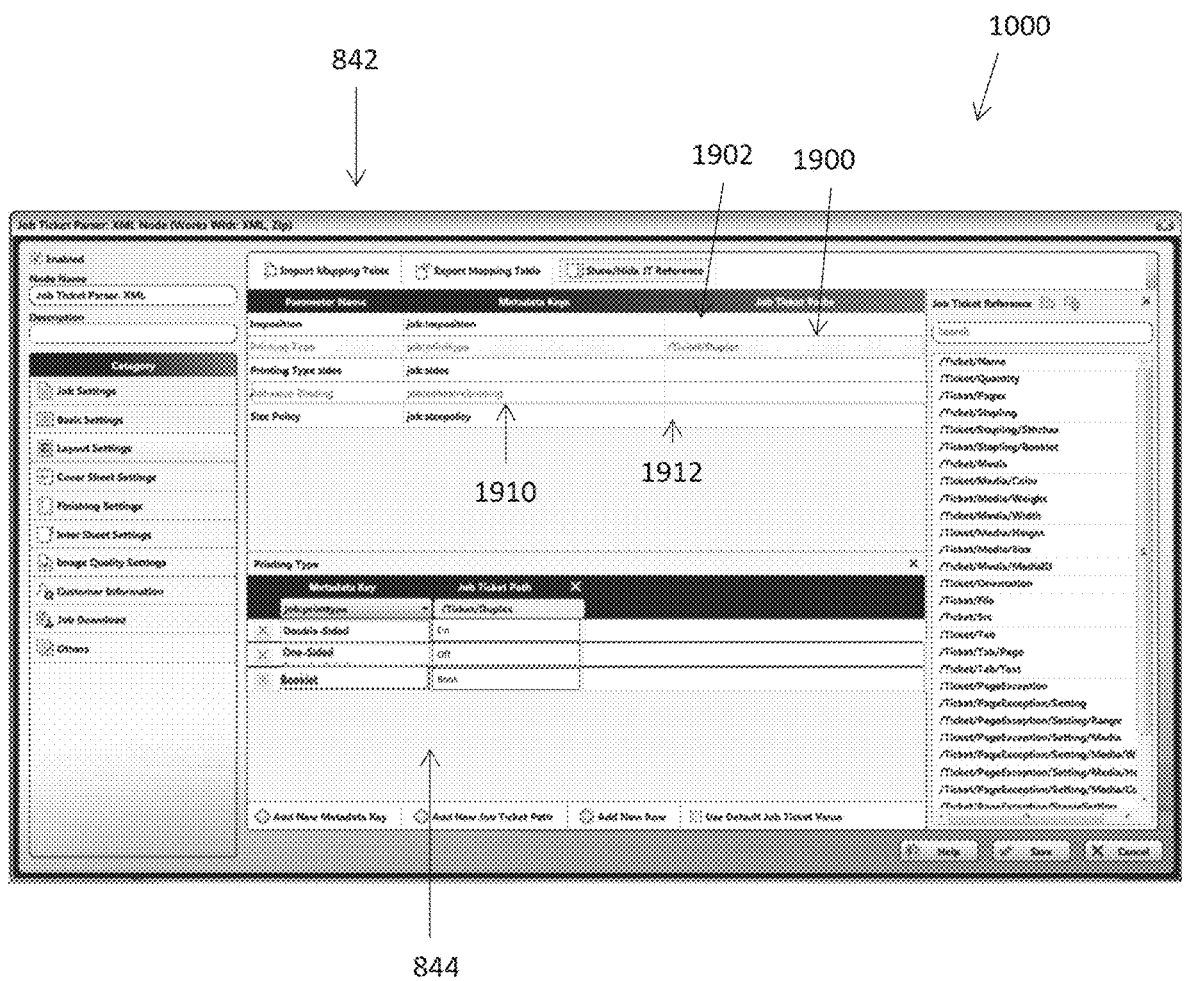
FIG. 19 is an illustration of a graphical user interface (or GUI) in accordance with an exemplary embodiment.

FIG. 19 is an illustration of a graphical user interface (or GUI) 1000 in accordance with an exemplary embodiment. As shown in FIG. 19, a target item 1900 all of which target values have been used in a successful print job can be shown in a different appearance from others 1902 in the item mapping pane 842. A similar control to the one described above can be applied to a target item 1910 that has been debugged by using a debug function. For example, a target item 1912, which has not be debugged with the debug function can be shown differently than the target item 1910 that has been debugged. For example, in accordance with an exemplary embodiment, the different appearance(s) can be a change in color of the row and/or column.

Figure 20:
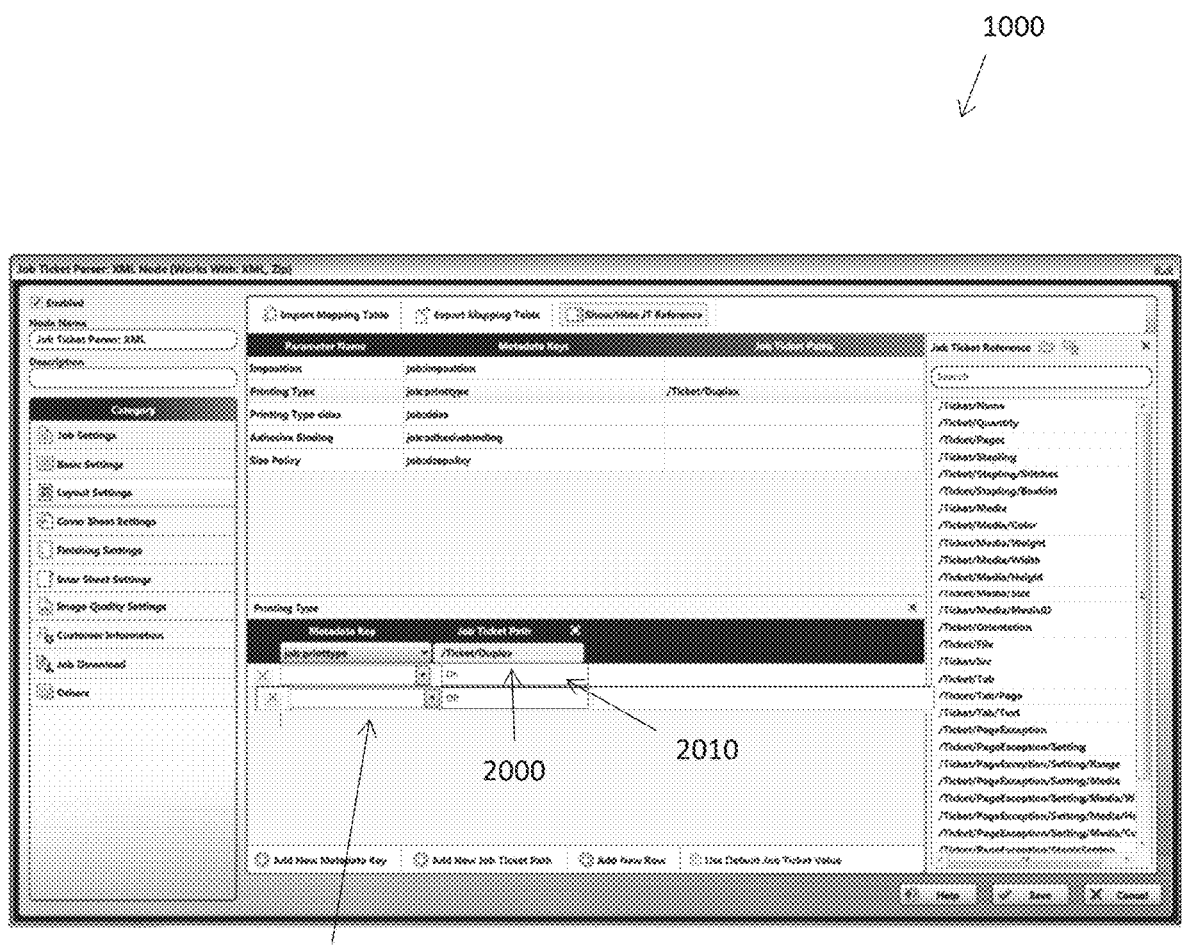
FIG. 20 is an illustration of a graphical user interface (or GUI) in accordance with an exemplary embodiment.

FIG. 20 is an illustration of a graphical user interface (or GUI) 1000 in accordance with an exemplary embodiment. As shown in FIG. 20, rows 2000 can be automatically added, to the value mapping pane 844, corresponding to the number of original values 2010 that are included in the sample job tickets 28, and the original values 2010 can be automatically set in the added row 2000.

Figure 21:
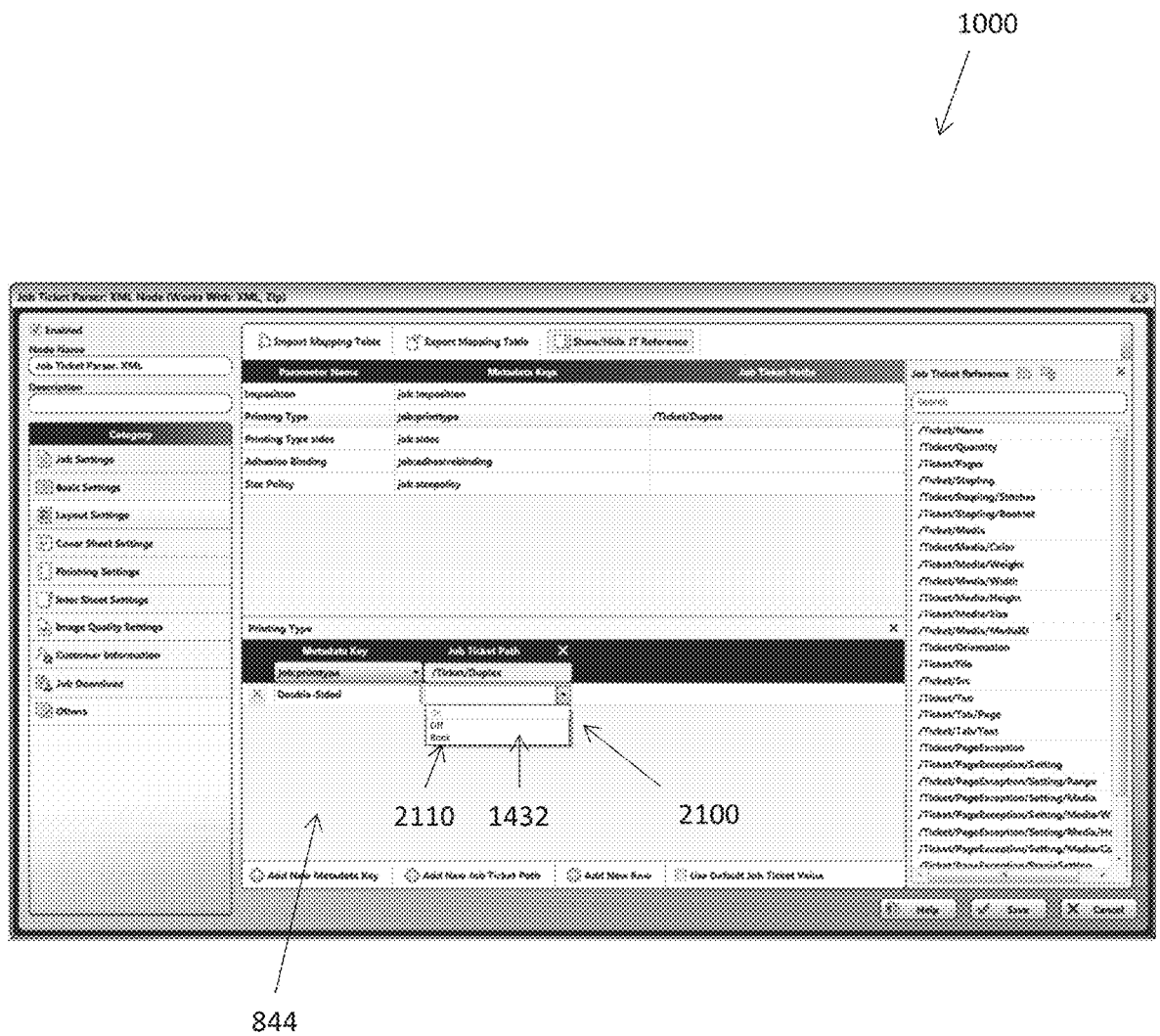
FIG. 21 is an illustration of a graphical user interface (or GUI) in accordance with an exemplary embodiment.

FIG. 21 is an illustration of a graphical user interface (or GUI) 1000 in accordance with an exemplary embodiment. As shown in FIG. 21, original values 2100 included in the sample job tickets 28 can be shown in different appearance from original values 2110 not received from the sample job tickets 28 in the value mapping pane 844 and/or dropdown menu 1432. For example, in accordance with an exemplary embodiment, the different appearance(s) can be a change in color of the row and/or column.

Various embodiments of the invention may have one or more of the following advantages: the ability to generate a native print job ticket that can be interpreted/executed by a printer based on a user print job ticket that cannot be interpreted/executed by the printer; the ability to map a user print parameter to one or more native print parameters using a table; the ability to populate the table (and thus create the mappings) using drag-and-drop operations; the ability to classify each user print parameter as a simple-type print parameter, a normal-type print parameter, and a complex-type print parameter; the ability to map user values to native values; the ability to use dictionaries with mapping objects and thus avoid modifying print manager software code when new print job ticket formats exists or when existing print job ticket formats are updated; the ability to update a dictionary by updating a table; etc.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for creating a mapping library for converting a job ticket, the method comprising:
    obtaining a print job ticket schema that comprises a plurality of user items and user values that is not in an executable print format for a printer controller, the printer controller being configured to support a different print format, the print job ticket schema being a data format configured to be converted into a print format, which is executable by the printer controller;
    obtaining at least one sample print ticket each of which comprises a part of the plurality of user items and user values in the print job ticket schema, which is not executable by the printer controller;
    obtaining a print job history for at least one print job successfully executed using a previously created job ticket, the previously created job ticket comprising user items and user values from the plurality of user items and user values of the print job ticket schema that have been converted into the print format, which is executable by the printer controller;
    displaying a graphical user interface (GUI), which allows a user to associate the user values with target values to be used to execute a print job, wherein at least one of the user values and/or at least one of the target values that was used for the successful at least one print job is shown in a different appearance from other user values and/or target values from the at least one sample print ticket that have not yet been associated with any target values;
    mapping one or more of the plurality of user items and user values from the at least one sample print ticket that have not yet been associated with any target values to one or more target values on the GUI; and
    associating each of the one or more of the plurality of user items and user values from the at least one sample print ticket that have not yet been associated with any target values to a target value in the mapping library, the target value being a native print parameter that is part of a native print job ticket, and wherein the native print job ticket is configured to be executed by the printer controller.

2. The method of claim 1, comprising:
    importing the at least one sample print ticket into the graphical user interface by selecting an icon on the graphical user interface; and
    populating a job ticket reference pane with the plurality of user items and user values from the at least one sample print ticket.

3. The method of claim 2, comprising:
    avoiding a duplication of a same user item or user value for plural sample print tickets in the job ticket reference pane.

4. The method of claim 2, wherein the mapping of one or more of the plurality of user items and user values from the at least one sample print ticket that have not yet been associated with any target values to the one or more target values on the GUI comprises:
    selecting an original item from the plurality of user items and user values in the job ticket reference pane and dragging and dropping the original item from the job ticket reference pane at a position corresponding to a target item in an item mapping pane.

5. The method of claim 4, comprising:
    producing a value mapping pane on the GUI by selecting a row in the item mapping pane, the row in the item mapping pane including the original item from the plurality of user items and user values and the target item in the item mapping pane.

6. The method of claim 4, wherein:
    when the target item is a normal-type or a complex-type print parameter, adding a new row in the value mapping pane, which includes a dropdown menu that includes selectable target values;
    selecting one target value to be associated with an original value from the dropdown menu; and
    displaying the selected one target value differently than target values not yet selected; or
    removing the selected one target value from the dropdown menu on the GUI.

7. The method of claim 4, wherein:
    when the original value is a normal-type or a complex-type print parameter, adding a new row in the value mapping pane, which includes a dropdown menu that includes selectable original values;
    selecting one original value to be associated with a target value from the dropdown menu; and
    displaying the selected one original value differently than original values not yet selected; or
    removing the selected one original value from dropdown menu on the GUI.

8. The method of claim 4, comprising:
    displaying a target item in which all target values have been associated with an original value differently than from other target items in the item mapping pane.

9. The method of claim 4, comprising:
    illustrating a combination of a target value and an original value that has been used in a successful print job differently in the value mapping pane from other target values and original values, which have not been used successfully in a print job.

10. The method of claim 4, comprising:
    illustrating a combination of a target value and an original value that has been debugged using a debug function differently in the value mapping pane from other target value and original values, which have not been debugged.

11. The method of claim 4, comprising:
    illustrating a target item of which all target values have been used in a successful print job differently in the item mapping pane than a target item of which not all target values have been used in a successful print job.

12. The method of claim 4, comprising:
    illustrating a target item of which all target values have been debugged using a debug function differently in the item mapping pane than a target item of which not all target values have been debugged.

13. The method of claim 4, comprising:
    automatically adding rows to the value mapping pane, which correspond to a number of original values that are included in the at least one sample job ticket, and the original values are automatically set in the added row.

14. The method of claim 4, comprising:
    illustrating original values included in the at least one sample job ticket differently in the value mapping pane and/or the dropdown menu than original values not from the at least one sample job ticket.

15. The method of claim 1, comprising:
    receiving, a user print job ticket comprising a print parameter and a first user value for the print parameter;

identifying, within the mapping library, a first mapping object for the print parameter;

determining, from the first mapping object, a first native print parameter corresponding to the print parameter;

determining, from the first mapping object, a first native value corresponding to the first user value;

generating, the native print job ticket comprising the first native print parameter and the first native value for the first native print parameter; and generating a hardcopy based on the native print job ticket by sending the native print job ticket to a printer.

16. The method of claim 15, wherein the print parameter corresponds to one of the following:

one-sided printing, two-sided printing, stapling, booklet, or a number of copies to be printed by the printer.

17. A non-transitory computer readable medium (CRM) storing computer program code executed by a computer processor that performs a process for creating a mapping library for converting a job ticket, the process comprising:

obtaining a print job ticket schema that comprises a plurality of user items and user values that is not an executable print format for a printer controller, the printer controller being configured to support a different print format, the print job ticket schema being a data format configured to be converted into a print format, which is executable by the printer controller;

obtaining at least one sample print ticket each of which comprises a part of the plurality of user items and user values in the print job ticket schema that is not executable by the printer controller;

obtaining a print job history for at least one print job successfully executed using a previously created job ticket, the previously created job ticket comprising user items and user values from the plurality of user items and user values of the print job ticket schema that is not executable by the printer controller;

displaying a graphical user interface (GUI), which allows a user to associate the user values with target values to be used to execute a print job, wherein at least one of the user values and/or at least one of the target values that was used for the successful at least one print job is shown in a different appearance from other user values and/or target values from the at least one sample print ticket that have not yet been associated with any target values;

mapping one or more of the plurality of user items and user values from the at least one sample print ticket that have not yet been associated with any target values to one or more target values on the GUI; and associating each of the one or more of the plurality of user items and user values from the at least one sample print ticket that have not yet been associated with any target values to a target value in the mapping library, the target value being a native print parameter that is part of a native print job ticket, and wherein the native print job ticket is configured to be executed by the printer controller.

18. A system for printing a job ticket received from a client computer, the system comprising:

a server having a memory and a processor, the processor configured to:

obtain a print job ticket schema that comprises a plurality of user items and user values that is not an executable print format for a printer controller, the printer controller being configured to support a different print format, the print job ticket schema being a data format configured to be converted into a print format, which is executable by the printer controller;

obtain at least one sample print ticket each of which comprises a part of the plurality of user items and user values in the print job ticket schema that is not executable by the printer controller;

obtain a print job history for at least one print job successfully executed using a previously created job ticket, the previously created job ticket comprising user items and user values from the plurality of user items and user values of the print job ticket schema that is not executable by the printer controller;

display a graphical user interface (GUI), which allows a user to associate the user values with target values to be used to execute a print job, wherein at least one of the user values and/or at least one of the target values that was used for the successful at least one print job is shown in a different appearance from other user values and/or target values from the at least one sample print ticket that have not yet been associated with any target values;

map one or more of the plurality of user items and user values from the at least one sample print ticket that have not yet been associated with any target values to one or more target values on the GUI; and associate each of the one or more of the plurality of user items and user values from the at least one sample print ticket that have not yet been associated with any target values to a target value in the mapping library, the target value being a native print parameter that is part of a native print job ticket, and wherein the native print job ticket is configured to be executed by the printer controller.

19. The system of claim 18, comprising:

the server configured to:

receive, a user print job ticket comprising a print parameter and a first user value for the print parameter;

identify, within the mapping library, a first mapping object for the print parameter;

determine, from the first mapping object, a first native print parameter corresponding to the print parameter;

determine, from the first mapping object, a first native value corresponding to the first user value; and generating, the native print job ticket comprising the first native print parameter and the first native value for the first native print parameter; and a printer configured to:

generate a hardcopy based on the native print job ticket received from the server.

20. The system of claim 19, wherein the print parameter corresponds to one of the following:

one-sided printing, two-sided printing, stapling, booklet, or a number of copies to be printed by the printer.

* * * * *